United States Patent
Kozaki

(10) Patent No.: US 10,634,147 B2
(45) Date of Patent: Apr. 28, 2020

(54) MAGNETIC LEVITATION VACUUM PUMP

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 592 days.

(21) Appl. No.: 15/408,531

(22) Filed: Jan. 18, 2017

(65) Prior Publication Data

US 2017/0268519 A1    Sep. 21, 2017

(30) Foreign Application Priority Data

Mar. 18, 2016 (JP) ................................. 2016-054980

(51) Int. Cl.
| | |
|---|---|
| F04D 19/04 | (2006.01) |
| F04D 27/00 | (2006.01) |
| F04D 29/058 | (2006.01) |
| F04D 29/66 | (2006.01) |
| H02N 15/00 | (2006.01) |

(Continued)

(52) U.S. Cl.
CPC ......... *F04D 19/048* (2013.01); *F04D 27/004* (2013.01); *F04D 29/058* (2013.01); *F04D 29/66* (2013.01); *B60L 13/04* (2013.01); *F16C 32/044* (2013.01); *F16C 32/0448* (2013.01); *F16C 2360/46* (2013.01); *H02N 15/00* (2013.01)

(58) Field of Classification Search
USPC .......... 361/139, 144, 160; 310/90.5
See application file for complete search history.

(56) References Cited

U.S. PATENT DOCUMENTS

| | | | |
|---|---|---|---|
| 7,564,670 B2 * | 7/2009 | Kozaki | F16C 32/0446 |
| | | | 361/139 |
| 9,624,974 B2 | 4/2017 | Kozaki et al. | |
| 2005/0212370 A1 * | 9/2005 | Kawashima | F04D 19/048 |
| | | | 310/90.5 |

FOREIGN PATENT DOCUMENTS

| | | |
|---|---|---|
| JP | 08-330962 | 12/1996 |
| JP | 2006-071069 A | 3/2006 |

OTHER PUBLICATIONS

Japanese Office Action (Notification of Reasons for Refusal) for corresponding Application No. 2016-054980 dated Jul. 29, 2019 (with English translation).

* cited by examiner

*Primary Examiner* — Danny Nguyen
(74) *Attorney, Agent, or Firm* — Renner, Otto, Boisselle & Sklar, LLP

(57) ABSTRACT

A magnetic bearing vacuum pump comprises: a first displacement signal generation section configured to amplify, by a resolution multiplying factor K of K>1, a displacement modulated wave signal modulated according to a displacement of the rotor from a predetermined position to generate a high-resolution displacement signal in a first displacement region including the predetermined position; a second displacement signal generation section configured to generate a low-resolution displacement signal in a larger second displacement region including the first displacement region; a selection section configured to select either one of the high-resolution displacement signal or the low-resolution displacement signal based on an unsteady-state response signal obtained by excluding a steady-state whirling displacement component from the high-resolution displacement signal or the low-resolution displacement signal; and a bearing control section configured to control the magnetic (Continued)

bearing based on the displacement signal selected by the selection section.

11 Claims, 28 Drawing Sheets

(51) Int. Cl.
*B60L 13/04* (2006.01)
*F16C 32/04* (2006.01)

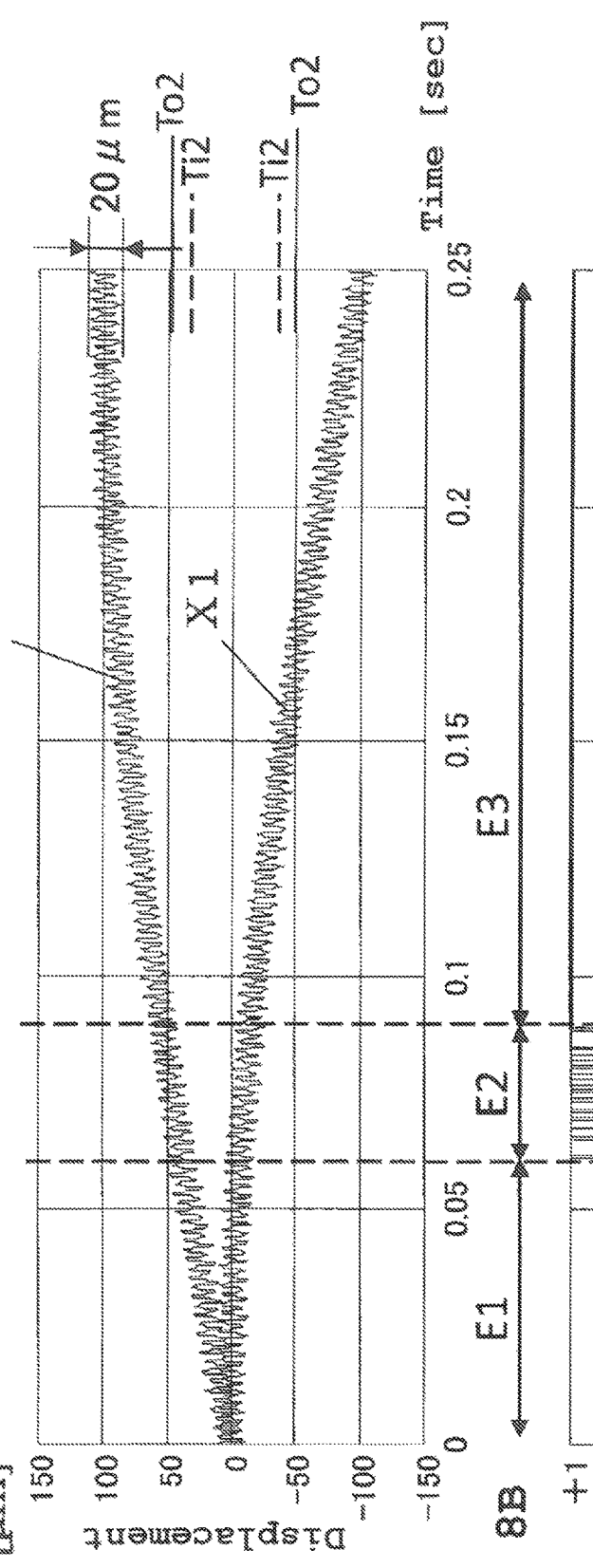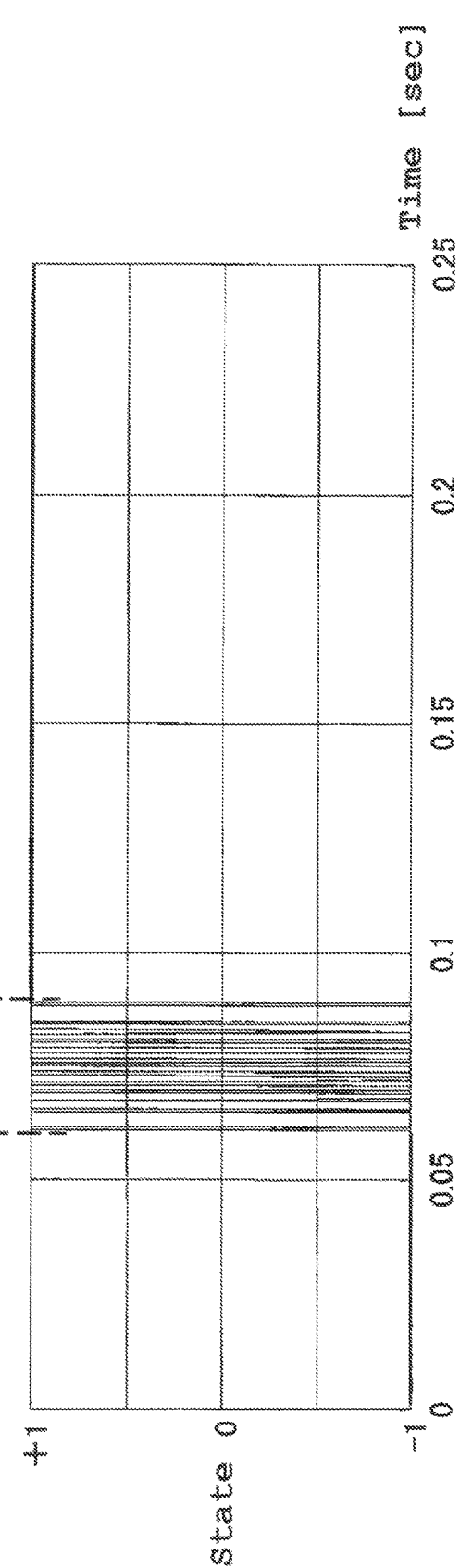
FIG. 8A
FIG. 8B

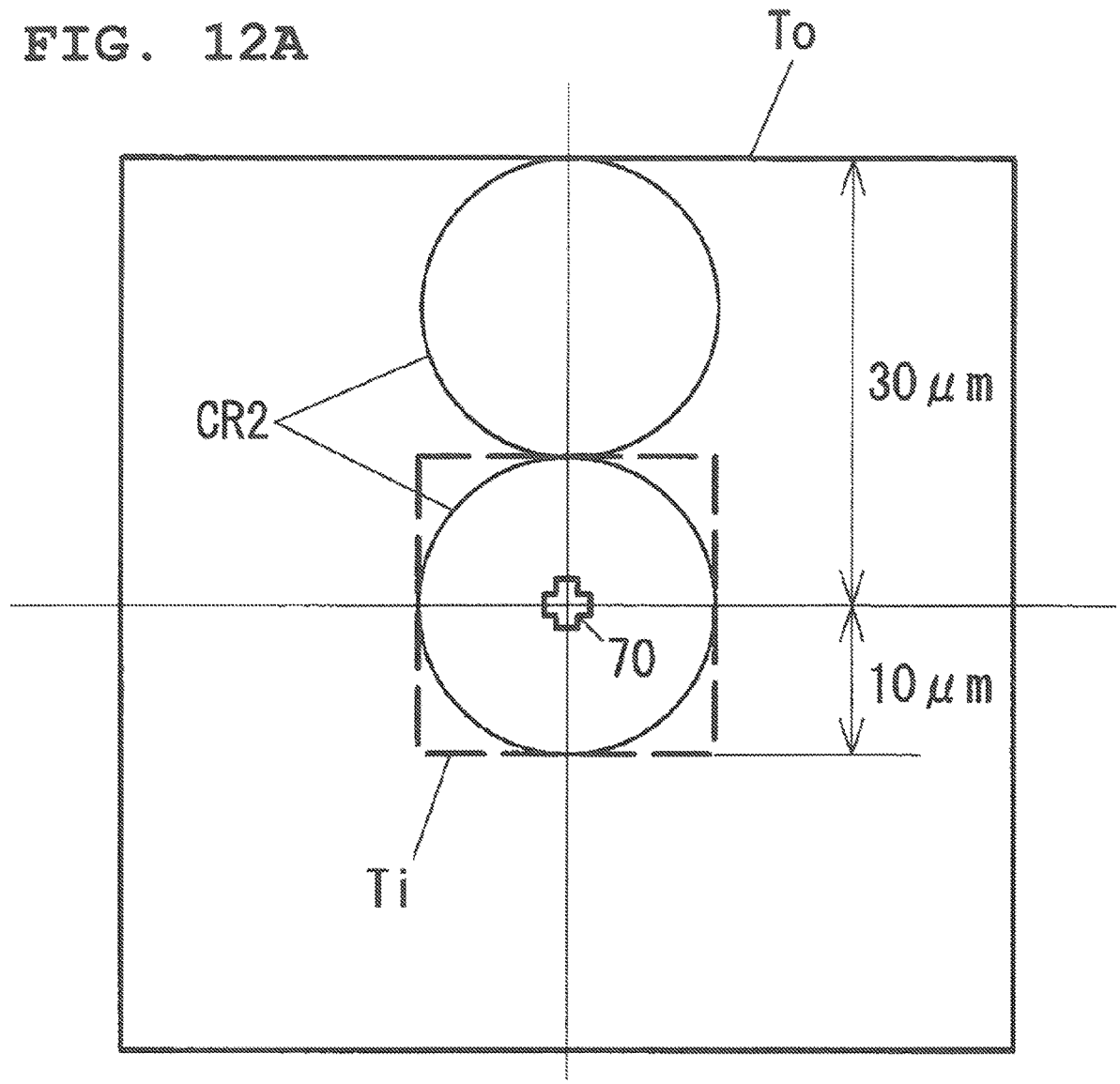

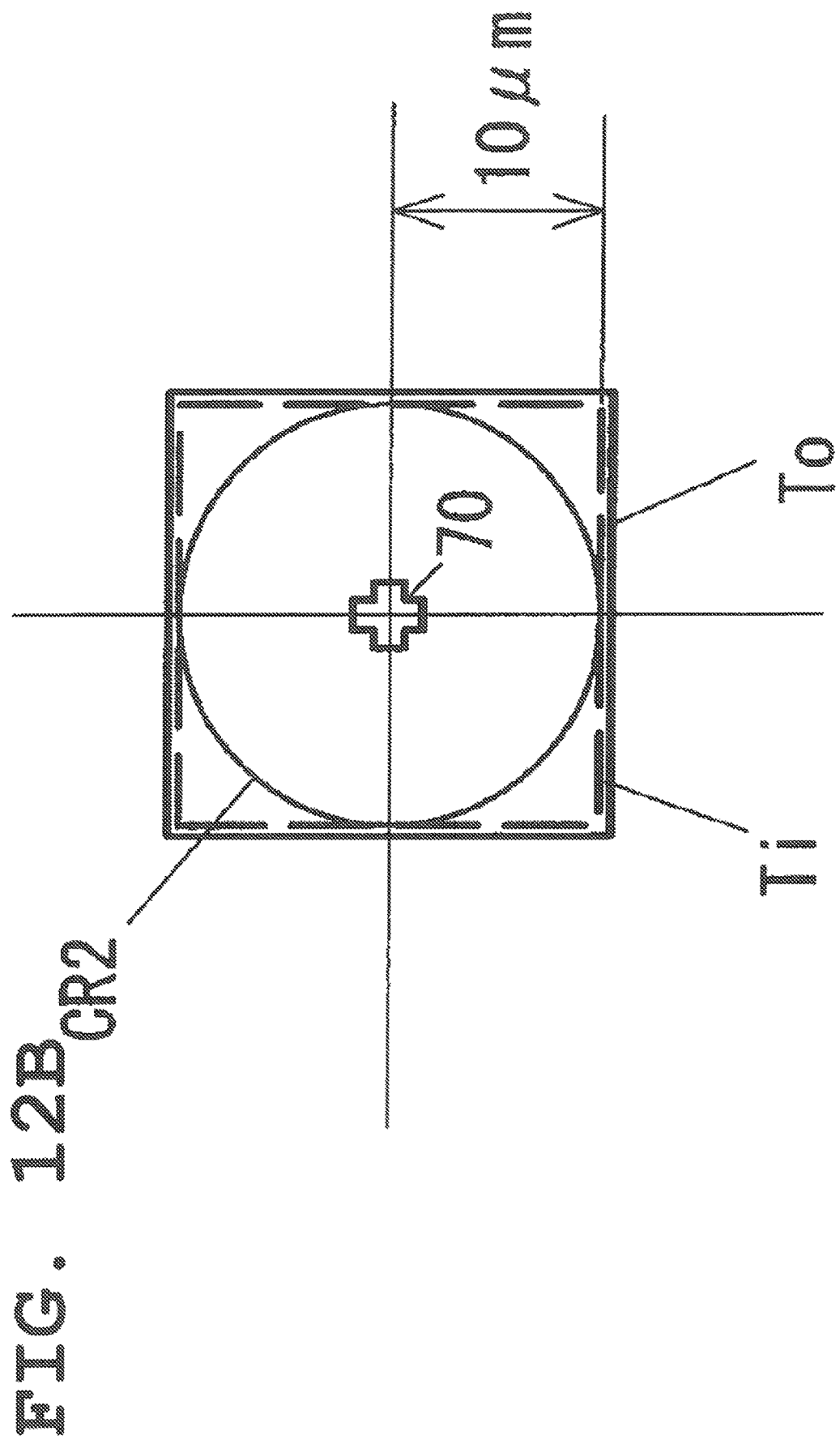

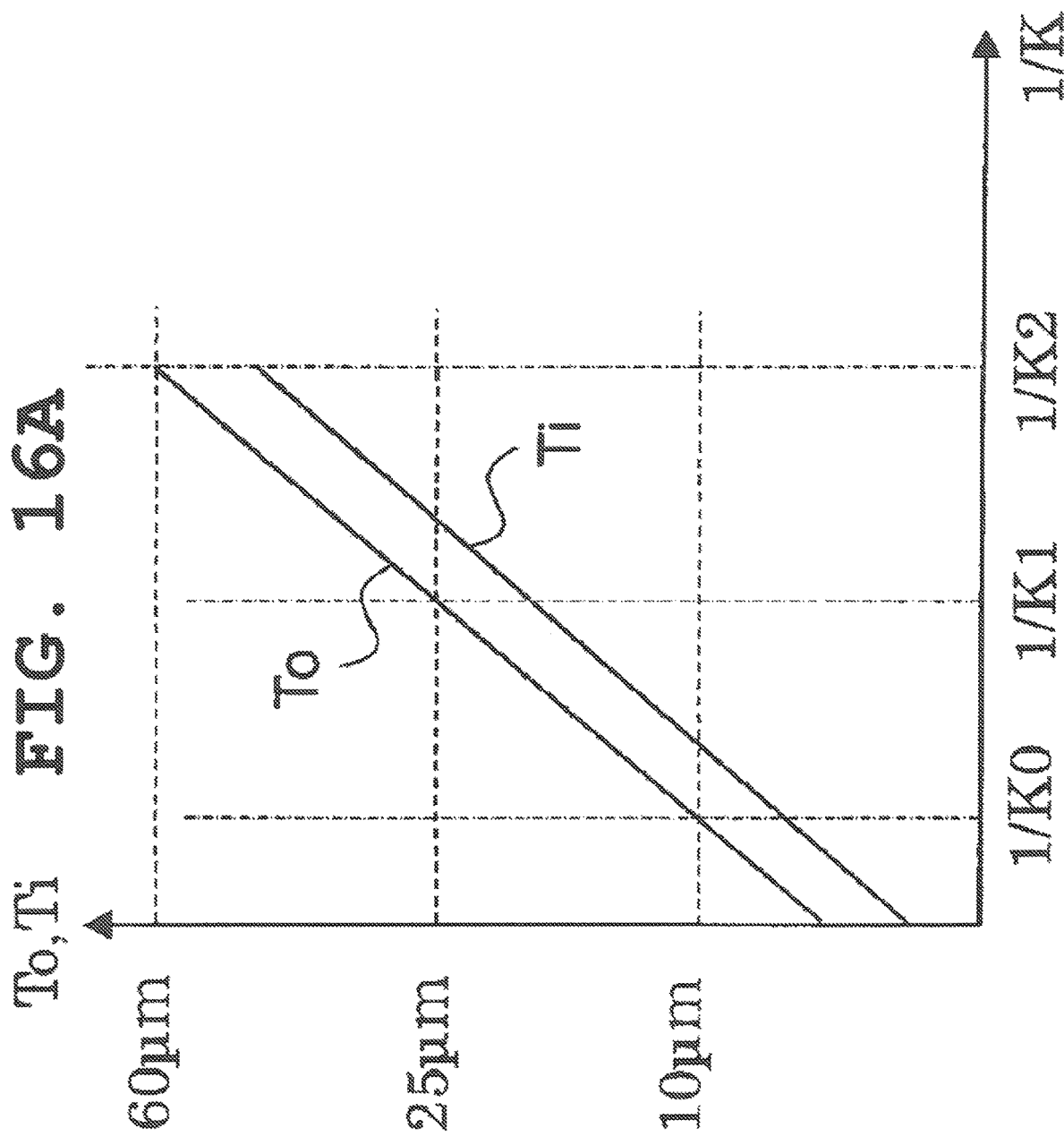

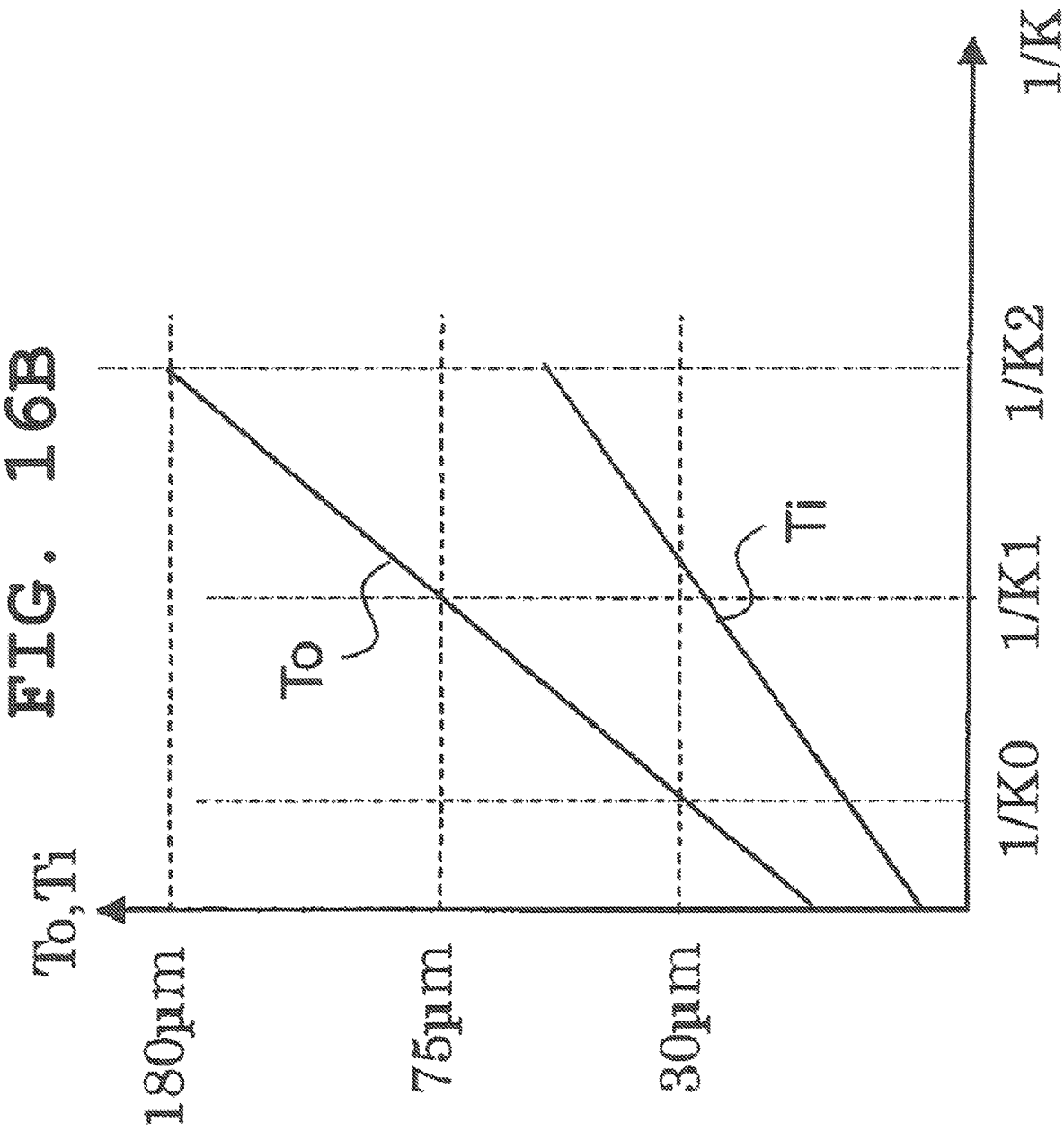

MAGNETIC LEVITATION VACUUM PUMP

BACKGROUND OF THE INVENTION

1. Technical Field

The present invention relates to a magnetic levitation vacuum pump.

2. Background Art

In a control type magnetic bearing vacuum pump, a rotor component rotates at high speed in non-contact with a stator component. In such a vacuum pump, even a touchdown bearing (an emergency mechanical bearing) as a portion having the minimum clearance has a clearance of about 100 μm. For this reason, a corrective machining criterion for rotor imbalance correction can be more relaxed as compared to a contact type ball bearing pump.

Under the presence of rotor imbalance, a whirling displacement is caused in a radial direction due to such rotor imbalance, and a vibration displacement is also caused in an axial direction due to such whirling in the radial direction. These displacements show a steady-state response of a rotation speed frequency component (or a harmonic component thereof). Regardless of whether the bearing is of a non-contact type or a contact type, such a steady-state response is, as reactive force corresponding to rotor axial displacement, transmitted to a stator side via spring stiffness of the bearing, and accordingly, noise is caused.

It has been known that a similar steady-state response is caused due to member scratches called "mechanical runout" and "electrical runout" and a variation in magnetic properties, in addition to imbalance.

Generally, the rotor axial displacement is represented by a steady-state response component associated with, e.g., imbalance and other components. These other components mainly include a component caused due to free vibration such as a transient displacement due to disturbance, but also include a minute noise component resulting in vibration on the stator side and caused due to sensing even in the state in which the transient displacement is converged. The noise component includes, for example, part of current spike which is caused due to PWM switching of an excitation amplifier configured to supply bearing current and which is superimposed on a sensing circuit after having flowed from a GND line around to the sensing circuit, and random noise caused due to a resolution when a signal is taken into a digital controller such as a FPGA via an AD converter.

In the case of using the vacuum pump for, e.g., an analysis measurement device such as an electron microscope or an experimental device often handled in vicinity to the vacuum pump by a researcher, the vacuum pump strongly requires vibration reduction and quietness. For a manufacturing purpose, not only a lithography device for semiconductor manufacturing but also an ion implantation device, a CVD device, an etching device, etc. often require vibration reduction and quietness.

In the ion implantation device, the CVD device, and the etching device, a solid-phase reactive product accompanied by a process adheres to the inside of a vacuum pump provided in a process vessel or provided on a downstream side. For example, when a reactive product adheres to a rotor of a turbo-molecular pump, rotor imbalance becomes greater over time, and a rotor whirling displacement during rotation at a rated speed gradually becomes greater.

In a technique described in Patent Literature 1 (JP-A-2006-71069), a high-resolution line is provided parallel to a typical low-resolution line in processing of a displacement signal. The presence or absence of overflow is determined based on whether or not an AD converter of the high-resolution line outputs an out-of-range signal, and then, the low-resolution line and the high-resolution line are switched to each other.

However, in the case of the configuration for performing switching operation as described above, when a whirling displacement is great, the displacement transitions up and down with respect to a switching threshold, leading to chattering. In a period for which chattering is caused, a displacement signal in each of a high-resolution region and a typical resolution region is repeatedly used. For this reason, various frequencies tend to be generated, and vibration/noise is newly caused due to excitation caused by such frequencies. Moreover, although a threshold hysteresis is provided to prevent occurrence of chattering, a greater whirling displacement results in a greater hysteresis width. This leads to a problem that resolution improvement is limited in the high-resolution region and that vibration reduction performance is limited.

SUMMARY OF THE INVENTION

A magnetic bearing vacuum pump comprises: a magnetic bearing configured to magnetically levitate a rotor; a first displacement signal generation section configured to amplify, by a resolution multiplying factor K of K>1, a displacement modulated wave signal modulated according to a displacement of the rotor from a predetermined position to generate a high-resolution displacement signal in a first displacement region including the predetermined position based on the amplified displacement modulated wave signal; a second displacement signal generation section configured to generate a low-resolution displacement signal in a larger second displacement region including the first displacement region based on the displacement modulated wave signal; a selection section configured to select either one of the high-resolution displacement signal or the low-resolution displacement signal based on an unsteady-state response signal obtained by excluding a steady-state whirling displacement component from the high-resolution displacement signal or the low-resolution displacement signal; and a bearing control section configured to control the magnetic bearing based on the displacement signal selected by the selection section.

The magnetic bearing vacuum pump further comprises: a steady-state response calculation section configured to calculate a steady-state whirling radius based on the high-resolution displacement signal or the low-resolution displacement signal; and a factor changing section configured to change the resolution multiplying factor K to any one of multiple values according to the steady-state whirling radius.

The first displacement signal generation section includes a first bandpass filter having a first Q-value and configured to filter the displacement modulated wave signal, an amplification section configured to amplify, by the resolution multiplying factor K, a signal having passed through the first bandpass filter, a first AD conversion section configured to perform analog-to-digital conversion for the amplified signal, and a reduction section configured to reduce the analog-to-digital converted signal with a reduction ratio lower than 1/the resolution multiplying factor, and the first displacement signal generation section generates the high-resolution displacement signal based on the reduced signal, the second displacement signal generation section includes a second bandpass filter having a second Q-value less than the first Q-value and configured to filter the displacement modulated wave signal, and a second AD conversion section configured to perform analog-to-digital conversion for a signal having passed through the second bandpass filter, and the second displacement signal generation section generates the low-resolution displacement signal based on a signal output from the second AD conversion section.

A magnetic bearing vacuum pump comprises: a magnetic bearing configured to magnetically levitate a rotor; a first displacement signal generation section configured to amplify, by a resolution multiplying factor K of K>1, a displacement modulated wave signal modulated according to a displacement of the rotor from a predetermined position to generate a high-resolution displacement signal in a first displacement region including the predetermined position based on the amplified displacement modulated wave signal; a second displacement signal generation section configured to generate a low-resolution displacement signal in a larger second displacement region including the first displacement region based on the displacement modulated wave signal; a selection section configured to select either one of the high-resolution displacement signal or the low-resolution displacement signal; a bearing control section configured to control the magnetic bearing based on the displacement signal selected by the selection section; a steady-state response calculation section configured to calculate a steady-state whirling radius based on the high-resolution displacement signal or the low-resolution displacement signal; and a factor changing section configured to change the resolution multiplying factor K to any one of multiple values according to the steady-state whirling radius.

The first displacement signal generation section includes a first bandpass filter having a first Q-value and configured to filter the displacement modulated wave signal, an amplification section configured to amplify, by the resolution multiplying factor K, a signal having passed through the first bandpass filter, a first AD conversion section configured to perform analog-to-digital conversion for the amplified signal, and a reduction section configured to reduce the analog-to-digital converted signal with a reduction ratio lower than 1/the resolution multiplying factor, and the first displacement signal generation section generates the high-resolution displacement signal based on the reduced signal, the second displacement signal generation section includes a second bandpass filter having a second Q-value less than the first Q-value and configured to filter the displacement modulated wave signal, and a second AD conversion section configured to perform analog-to-digital conversion for a signal having passed through the second bandpass filter, and the second displacement signal generation section generates the low-resolution displacement signal based on the analog-to-digital converted signal.

A magnetic bearing vacuum pump comprises: a magnetic bearing configured to magnetically levitate a rotor; a first bandpass filter having a first Q-value and configured to filter a displacement modulated wave signal modulated according to a displacement of the rotor from a predetermined position; an amplification section configured to amplify, by a resolution multiplying factor K of K>1, a signal having passed through the first bandpass filter; a first AD conversion section configured to perform analog-to-digital conversion for the signal amplified by the amplification section; a reduction section configured to reduce the signal analog-to-digital converted by the first AD conversion section with a reduction ratio lower than 1/the resolution multiplying factor; a first displacement signal generation section configured to generate a high-resolution displacement signal in a first displacement region including the predetermined position based on the signal reduced by the reduction section; a second bandpass filter having a second Q-value less than the first Q-value and configured to filter the displacement modulated wave signal; a second AD conversion section configured to perform analog-to-digital conversion for a signal having passed through the second bandpass filter; a second displacement signal generation section configured to generate a low-resolution displacement signal in a larger second displacement region including the first displacement region based on the signal analog-to-digital converted by the second AD conversion section; a selection section configured to select either one of the high-resolution displacement signal or the low-resolution displacement signal; and a bearing control section configured to control the magnetic bearing based on the displacement signal selected by the selection section.

The steady-state whirling radius when the resolution multiplying factor K is changed from a first value to a second value less than the first value is, by a predetermined hysteresis width, set greater than the steady-state whirling radius when the resolution multiplying factor K is changed from the second value to the first value.

The selection section switches the selected displacement signal from the low-resolution displacement signal to the high-resolution displacement signal when a value of the unsteady-state response signal changes from an outside to an inside of a first signal region, and switches the selected displacement signal from the high-resolution displacement signal to the low-resolution displacement signal when the value of the unsteady-state response signal changes from an inside to an outside of a larger second signal region including the first signal region.

When a ratio between the steady-state whirling radius and an upper limit of the displacement from the predetermined position is α, the resolution multiplying factor K is set to satisfy an expression of $1/(3\alpha)<K<1/\alpha$.

BRIEF DESCRIPTION OF THE DRAWINGS

FIGS. 8A and 8B are graphs for describing occurrence of chattering;

FIGS. 12A and 12B are graphs for describing the method for setting a resolution multiplying factor K;

FIGS. 16A and 16B are graphs of an example of a relationship among the resolution multiplying factor K and the thresholds To, Ti;

DETAILED DESCRIPTION OF THE EXEMPLARY EMBODIMENTS

Hereinafter, embodiments of the present invention will be described with reference to the drawings.

First Embodiment

Figure 1:
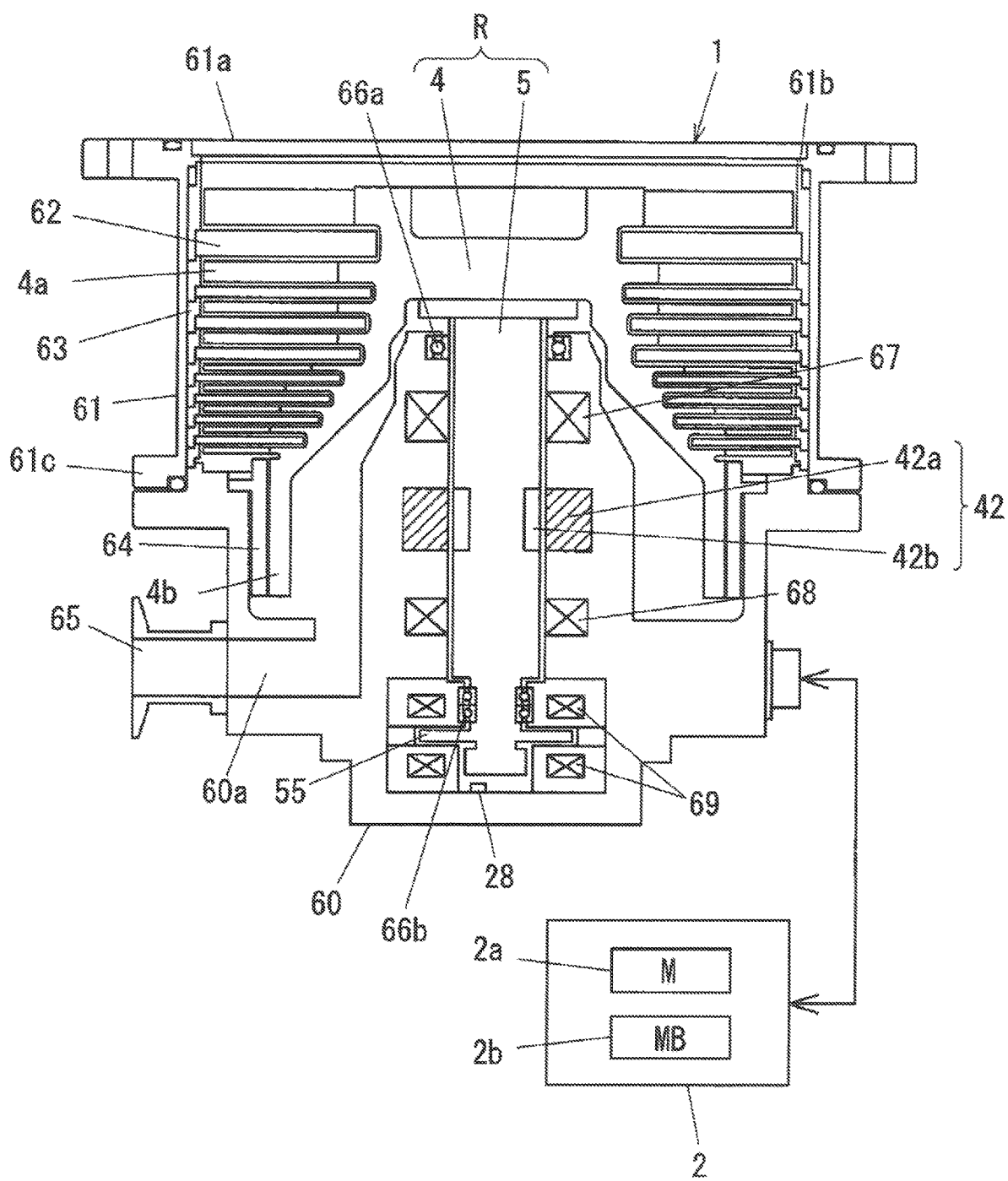
FIG. 1 is a view of a pump unit configuration of a vacuum pump of an embodiment.

FIG. 1 is a view of an outline configuration of a vacuum pump of the present embodiment. The vacuum pump illustrated in FIG. 1 is a magnetic levitation type turbo-molecular pump, and includes a pump unit 1 and a control unit 2 configured to drive the pump unit 1. Note that the control unit 2 may be provided separately from the pump unit 1, or may be provided integrally with the pump unit 1. The control unit 2 includes a motor drive control section 2a configured to drive and control a motor 42, and a bearing drive control section 2b configured to drive and control magnetic bearings 67, 68, 69.

The pump unit 1 includes a turbo pump stage having rotor blades 4a and stationary blades 62, and a drag pump stage (a screw groove pump) having a cylindrical portion 4b and a screw stator 64. In the present embodiment, a screw groove is formed at the screw stator 64, but may be formed at the cylindrical portion 4b.

The rotor blades 4a and the cylindrical portion 4b are formed at a pump rotor 4. The pump rotor 4 is fastened to a rotor shaft 5. The pump rotor 4 and the rotor shaft 5 form a rotor unit R. The stationary blades 62 and the rotor blades 4a are alternately arranged in an axial direction. Each stationary blade 62 is placed on a base 60 with spacer rings 63 being interposed therebetween. When a fixed flange 61c of a pump casing 61 is fixed to the base 60 with bolts, the stack of the spacer rings 63 is sandwiched between the base 60 and a lock portion 61b of the pump casing 61, and in this manner, the stationary blades 62 are positioned.

The rotor shaft 5 is non-contact supported by the magnetic bearings 67, 68, 69 provided at the base 60. Each of the magnetic bearings 67, 68, 69 includes electromagnets and a displacement sensor. The displacement sensor is configured to detect the levitation position of the rotor shaft 5. Note that the electromagnets forming the axial magnetic bearing 69 are arranged to sandwich, in the axial direction, a rotor disc 55 provided at a lower end of the rotor shaft 5.

The rotor shaft 5 is rotatably driven by the motor 42. The motor 42 is a synchronous motor, and a DC brushless motor is used in the present embodiment. The motor 42 includes a motor stator 42a disposed at the base 60, and a motor rotor 42b provided at the rotor shaft 5. A permanent magnet is provided at the motor rotor 42b. Rotation of the rotor shaft 5 is detected by a rotation sensor 28. For example, an inductance sensor is used as the rotation sensor 28. When the magnetic bearings are not in operation, the rotor shaft 5 is supported by emergency mechanical bearings 66a, 66b.

An exhaust port 65 is provided at an outlet 60a of the base 60, and a back pump is connected to the exhaust port 65. The rotor unit R is magnetically levitated while being rotatably driven at high speed by the motor 42, and in this manner, gas molecules are exhausted from an inlet 61a to the exhaust port 65.

Figure 2:
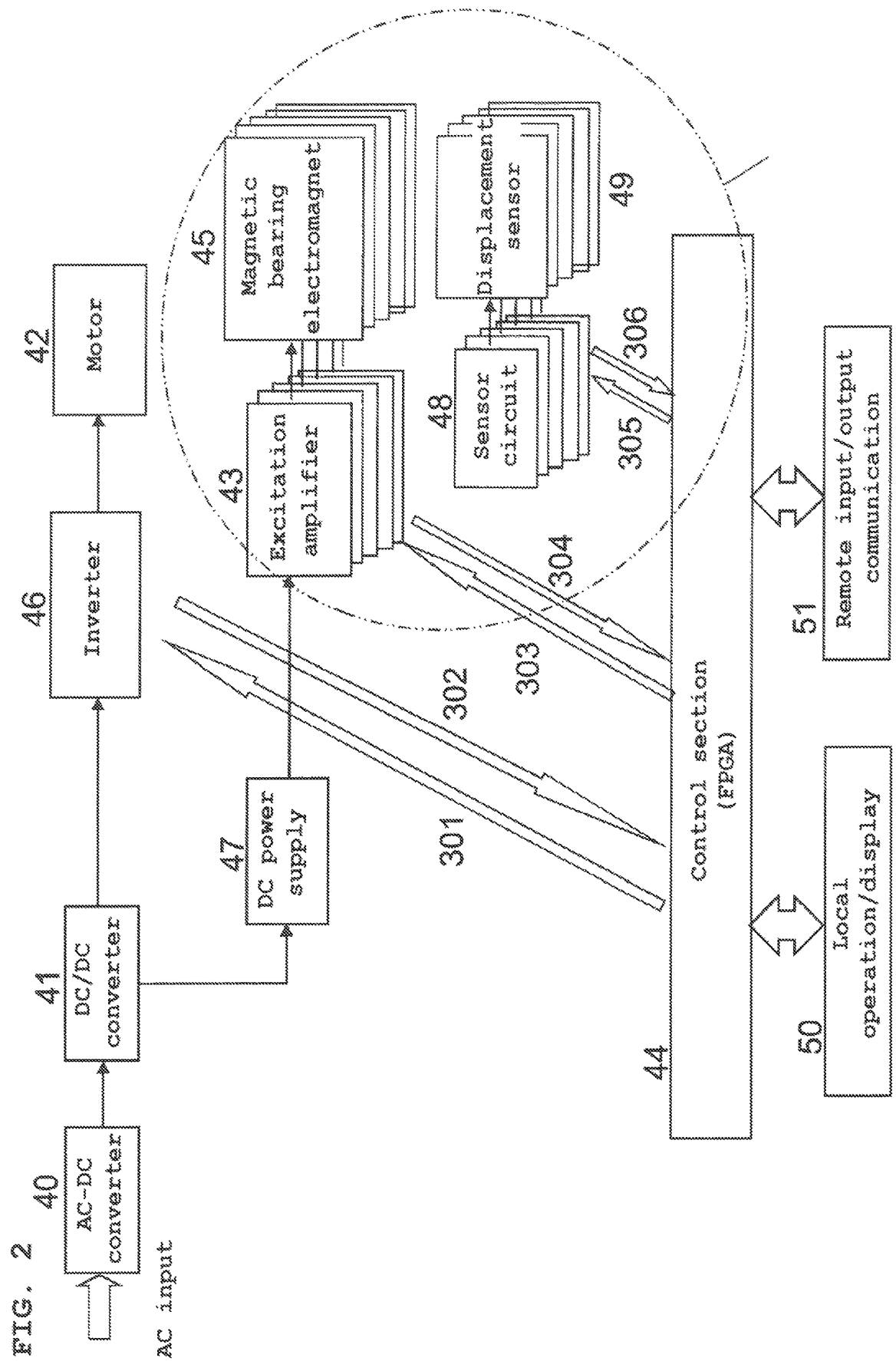
FIG. 2 is a block diagram for describing a control system of the vacuum pump.

FIG. 2 is a block diagram of an outline configuration of a control system, i.e., the control unit 2, of the vacuum pump. AC input from the outside is converted into DC output (DC voltage) by an AC/DC converter 40 provided at the control unit 2. The DC voltage output from the AC/DC converter 40 is input to a DC/DC converter 41, and then, the DC/DC converter 41 generates DC voltage for the motor 42 and DC voltage for the magnetic bearings.

The DC voltage for the motor 42 is input to an inverter 46. The DC voltage for the magnetic bearings is input to a DC power source 47 for the magnetic bearings. The magnetic bearings 67, 68, 69 form a five-axis magnetic bearing. Each of the magnetic bearings 67, 68 includes two pairs (for two axes) of magnetic bearing electromagnets 45, and the magnetic bearing 69 includes a pair (for one axis) of magnetic bearing electromagnets 45. For five pairs of magnetic bearing electromagnets 45, i.e., ten magnetic bearing electromagnets 45, current is separately supplied from ten excitation amplifiers 43 provided corresponding respectively to the magnetic bearing electromagnets 45.

A control section 44 is a digital calculator configured to control the motor and the magnetic bearings, and in the present embodiment, a field programmable gate array (FPGA) is used. For the inverter 46, the control section 44 outputs a PWM control signal 301 for controlling ON/OFF of a plurality of switching elements included in the inverter 46. For each excitation amplifier 43, the control section 44 outputs a PWM control signal 303 for controlling ON/OFF of a switching element included in the excitation amplifier 43.

Moreover, a sensor carrier signal (a carrier signal) 305 is input from the control section 44 to each sensor circuit 48. The sensor carrier signal is applied to each displacement sensor 49 via a filter circuit for phase adjustment, and then, is modulated by the displacement sensor 49 according to a rotor displacement. A sensor signal (a displacement modulated wave signal) 306 modulated according to the rotor displacement is input to the control section 44 via each sensor circuit 48. Moreover, a signal 302 indicating the phase voltage and phase current of the motor 42 and electromagnetic current signals 304 of the magnetic bearings are input to the control section 44.

The motor drive control section 2a illustrated in FIG. 1 corresponds to a motor control system including the inverter 46 and the control section 44. Moreover, the bearing drive control section 2b corresponds to a bearing control system including the excitation amplifiers 43, the sensor circuits 48, and the control section 44. An operation/display section 50 configured to display a pump state and perform local operation and an input/output communication section 51 configured to exchange a remote signal with the outside and communicate with the outside are connected to the control section 44.

Figure 3:
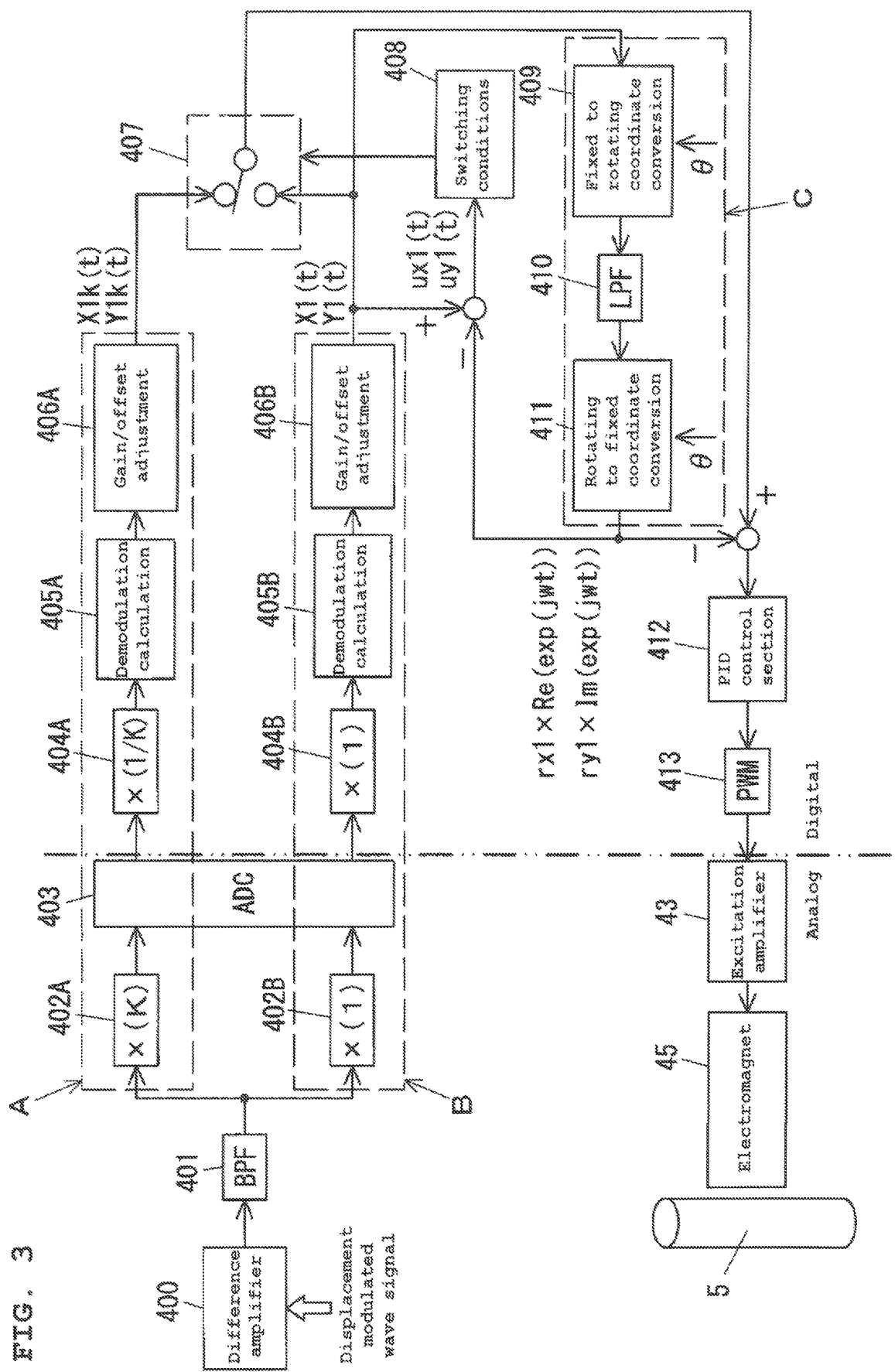
FIG. 3 is a block diagram for describing magnetic bearing control in the embodiment.

FIG. 3 is a functional block diagram for describing magnetic bearing control in the present embodiment. The block diagram of FIG. 3 illustrates a configuration for two axes of an x1-axis and a y1-axis (e.g., the x-axis and y-axis of the magnetic bearing 67 in a radial direction). In FIG. 3, the processing (digital processing) for the right block with respect to a chain double-dashed line is performed by the control section (FPGA) 44 of FIG. 2. The sensor signals (the displacement modulated wave signals) 306 modulated by the displacement sensors 49 of FIG. 2 are input to a difference amplifier 400, and then, difference signals are generated at the difference amplifier 400. That is, a difference signal between two sensor signals of the x1-axis and a difference signal between two sensor signals of the y1-axis are generated.

After bandpass processing using a sensor carrier frequency as a center frequency has been performed for the difference signals at a bandpass filter 401, the signals are branched into two sections. Displacement signals based on the difference signals are used for the magnetic bearing control, and it is, in the present embodiment, configured to provide the function of generating, based on two branched difference signals, two displacement signals having different resolutions to selectively use these two displacement signals. In a series of processing as indicated by a reference character A, a high-resolution displacement signal is generated. In a series of processing as indicated by a reference character B, a displacement signal corresponding to a displacement signal in a typical turbo-molecular pump is generated. The displacement signal generated by the processing system A is hereinafter referred to as a "high-resolution displacement signal," and the displacement signal generated by the processing system B is hereinafter referred to as a "normal-resolution displacement signal."

Figure 25:
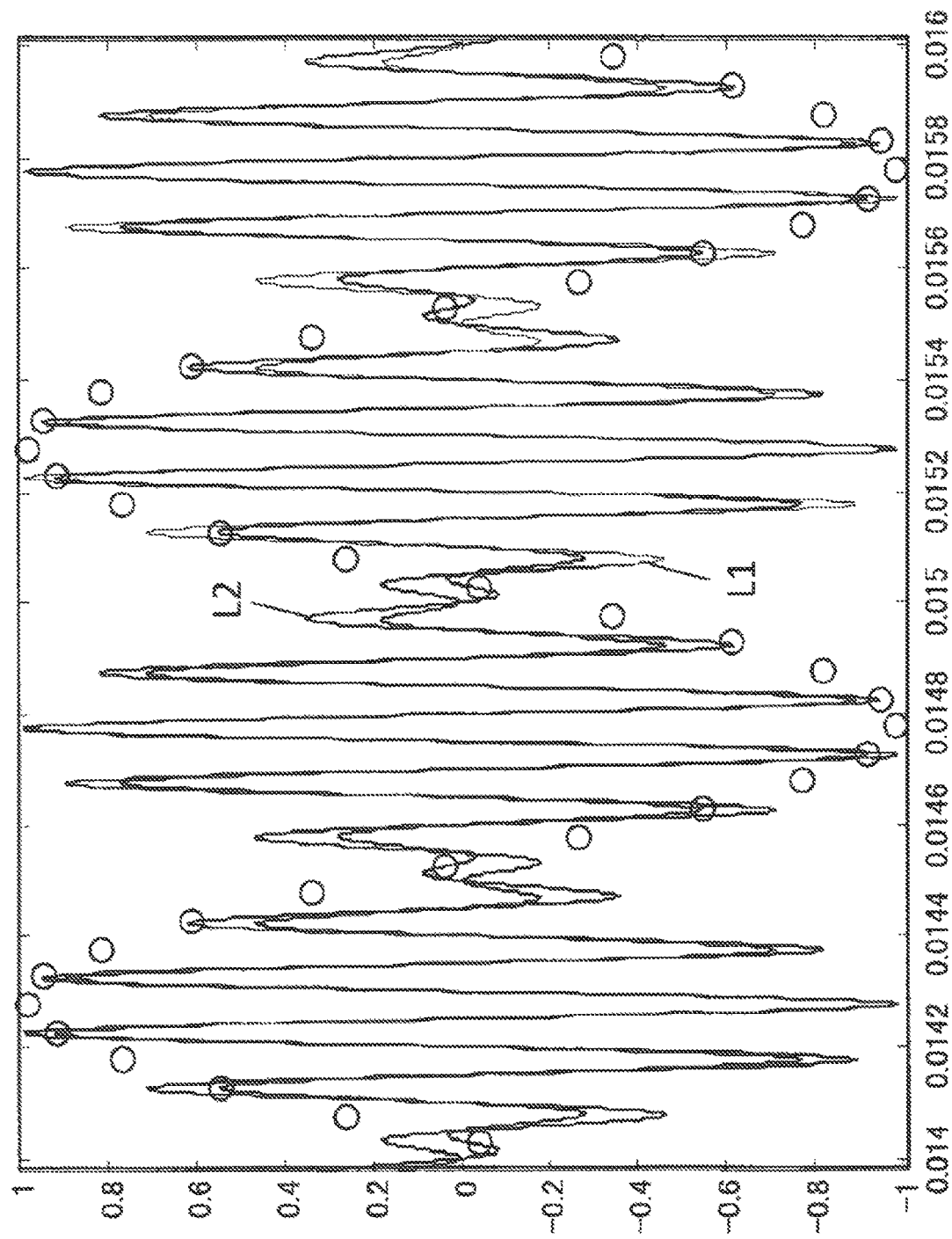
FIG. 25 is a graph of an example of a displacement modulated wave signal before and after passage of a band-pass filter.

Note that in the present embodiment, the processing of demodulating the displacement signal is performed by synchronous sampling. The demodulation processing is performed as follows: a PWM carrier signal and a sensor carrier signal are, in advance, brought into a synchronization relationship at the integral multiple of frequency, and are synchronized with each other at the timing of a carrier wave peak position shifted in advance from the timing of spike resulting in noise; and then, the resultant is taken out from an AD converter. FIG. 25 is a graph of an example of the displacement modulated wave signal before and after passage of the bandpass filter. A line L1 indicates the displacement modulated wave signal before passage of the bandpass filter, and a line L2 indicates the displacement modulated wave signal having passed through the bandpass filter. Moreover, a circle mark indicates a synchronous sampling value, i.e., the demodulated displacement signal. As described above, it is configured such that the demodulation processing is digitally performed in the present embodiment, but the present invention is applicable to the case of performing analog demodulation processing.

In the processing system A, the difference signal is amplified to K-fold by an amplification section 402A, and then, is AD-sampled by an AD converter 403. The value of K is set to K>1. In the processing system A, amplification to K-fold is performed only for an adjacent region about a target levitation position of the rotor shaft 5, and in this manner, a high-resolution displacement signal effectively using the dynamic range of the AD converter 403 is generated. The difference signal taken into the AD converter 403 is amplified to (1/k)-fold by digital calculation processing at an amplification section 404A. That is, the difference signal amplitude increased to K-fold by the amplification section 402A is, by the amplification section 404A, changed back to the amplitude before amplification to K-fold. A greater value of K results in a higher resolution. The value of K is hereinafter referred to as a "resolution multiplying factor."

In a demodulation calculation section 405A, demodulation calculation is performed based on the difference signal output from the amplification section 404A. In a gain/offset adjustment section 406A, gain adjustment and offset adjustment are performed for the demodulated signal. Note that in the AD converter 403, two channels for the x1-axis and two channels for the y1-axis, i.e., the total of four channels for two axes, are used.

Meanwhile, in the processing system B, the difference signal is amplified to one-fold by the amplification section 402A, and then, is AD-sampled by the AD converter 403. Subsequently, amplification to (1/1)-fold is performed by an amplification section 404B. That is, the normal-resolution displacement signal generated in the processing system B corresponds to the displacement signal in the typical turbo-molecular pump, and is a displacement signal covering a displacement region until the rotor shaft 5 comes into contact with the mechanical bearings 66a, 66b. In a demodulation calculation section 405B and a gain/offset adjustment section 406B of the processing system. B, processing similar to that in the demodulation calculation section 405A and the gain/offset adjustment section 406A of the processing system A is performed.

Note that in the typical processing of generating the normal displacement signal, a difference signal subjected to bandpass processing is taken into an AD converter, and then, demodulation calculation is performed. Amplification sections 402B, 404B as illustrated in FIG. 3 are not provided. In the present embodiment, the amplification sections 402B, 404B of which amplification factor is one are provided corresponding to the processing system A, but the amplification sections 402B, 404B may be omitted as in the typical configuration.

A switching section 407 selects whether the high-resolution displacement signal ($X1k(t)$, $Y1k(t)$) generated in the processing system. A or the normal-resolution displacement signal ($X1(t)$, $Y1(t)$) generated in the processing system B is used. Switching by the switching section 407 is controlled by a switching control section 408. The switching control section 408 is configured to control switching by the switching section 407 based on signals ($ux1(t)$, $uy1(t)$) having other components than a later-described steady-state response.

[x1-Axis Displacement and y1-Axis Displacement]

The high-resolution displacement signal generated in the processing system A and the normal-resolution displacement signal generated in the processing system B are signals for a displacement X1(t) of the x1-axis of the rotor shaft 5 and a displacement Y1(t) of the y1-axis of the rotor shaft 5. Generally, the displacement of the rotor shaft 5 is represented by a steady-state response component (a whirling displacement component) due to, e.g., imbalance and other components. The displacement X1(t) of the x1-axis is represented by the following expression (1), and the displacement Y1(t) of the y1-axis is represented by the following expression (2). In the expressions (1) and (2), the first term on the right hand indicates the steady-state response component, and the second term on the right hand indicates other components than the steady-state response component. Moreover, "j" indicates an imaginary number, "Re" indicates a real part, "Im" indicates an imaginary part, and "rx1" and "ry1" indicate a whirling radius. Further, "ω" indicates a rotation angular speed, and "nω" is used for an n-th harmonic instead of "ω."

$$X1(t)=rx1 \times Re(\exp(j\omega t))+ux1(t) \quad (1)$$

$$Y1(t)=ry1 \times Im(\exp(j\omega t))+uy1(t) \quad (2)$$

Note that as shown in the following expressions (3) to (5), a displacement is similarly represented for the remaining three axes (an x2-axis, a y2-axis, and a z-axis). The signs "φ" and "φz" indicate shift of the phases of the x2-axis, the y2-axis, and the z-axis with respect to the steady-state response phases of the x1-axis and the y1-axis.

$$X2(t)=rx2 \times Re(\exp(j(\omega t+\phi)))+ux2(t) \quad (3)$$

$$Y2(t)=ry2 \times Im(\exp(j(\omega t+\phi)))+uy2(t) \quad (4)$$

$$Z(t)=rz \times Re(\exp(j(\omega t+\phi z)))+uz(t) \quad (5)$$

Typically, the whirling displacement radius is rx1=ry1 and rx2=ry2. Due to an error such as a slight difference in sensitivity, these radiuses are indicated by different signs. However, description will be made below, supposing that the above-described equations are satisfied. Moreover, only four axes in the radial direction are often targeted in a typical case. However, due to influence of imbalance, a steady-state response might be also caused for one axis (the z-axis) in an axial direction, and for this reason, the expression (5) is added.

As described above, other components ux1(t) to uz(t) than the steady-state response are mainly caused due to free vibration such as a transient displacement caused by disturbance. However, even when the transient displacement is converged, a minute noise component resulting in vibration on a stator side and caused due to sensing is contained. The noise component includes, for example, part of current spike which is caused due to PWM switching of an excitation amplifier configured to supply bearing current and which is superimposed on a sensing circuit after having flowed from a GND line around to the sensing circuit, and random noise caused due to a resolution when a signal is taken into a digital controller such as a FPGA via an AD converter.

Not only the normal-resolution displacement signal output from the gain/offset adjustment section 406B of FIG. 3 but also the high-resolution displacement signal output from the gain/offset adjustment section 406A of FIG. 3 are the displacement signals for the x1-axis displacement X1(t) and the y1-axis displacement Y1(t) represented by the expressions (1) and (2). The normal-resolution displacement signal described herein is represented by the same signs "X1(t)" and "Y1(t)" as those of the displacement, and the high-resolution displacement signal described herein is represented by the signs "X1k(t)" and "Y1k(t)."

The normal-resolution displacement signal X1(t), Y1(t) output from the gain/offset adjustment section 406B is input to a steady-state response extraction section C. The steady-state response extraction section C is configured to extract a signal corresponding to a steady-state response component rx1×Re(exp(jωt)), ry1×Im(exp(jωt)) in the above-described expressions (1) and (2). Such an extracted signal is hereinafter referred to as a "steady-state response signal."

In a first conversion processing section 409, the steady-state response extraction section C first converts the normal-resolution displacement signal X1(t), Y1(t) into a signal of a rotating coordinate system rotating from a fixed coordinate system at an angle of θ. The angle θ described herein is the rotation angle of the rotor shaft 5 based on a detection signal of the rotation sensor 28 of FIG. 1. In the case of a vacuum pump including no rotation sensor 28, motor rotation information (e.g., a motor electric angle) may be obtained from the motor drive control section 2a (FIG. 1), and then, the rotation angle of the rotor shaft 5 may be obtained based on such motor rotation information. Note that the angle θ is used for a rotation frequency component as described above, but nθ is used for the n-th harmonic.

Next, low-pass filtering processing is performed for the signal output from the first conversion processing section 409 in a low-pass filter 410, thereby removing other frequency components than a rotation component. In magnetic levitation control, the normal-resolution displacement signal X1(t), Y1(t) input to the first conversion processing section 409 also contains other signals than the rotation component, and therefore, the low-pass filtering processing of removing other signals than the rotation component needs to be performed right after conversion processing. The processing of conversion from the fixed coordinate system into the rotating coordinate system is a type of oversampling signal processing on the premise of a quasi-steady response, and therefore, delay influence is small even when the low-pass filter 410 for removing a high-frequency AC component other than the rotation component is provided.

In a second conversion processing section 411, the processing of conversion from the rotating coordinate system into the fixed coordinate system is performed for the signal subjected to the low-pass filtering processing, and in this manner, a signal only having the steady-state response component (i.e., the whirling component) of the normal-resolution displacement signal X1(t), Y1(t) is generated. Note that in calculation in the second conversion processing section 411, when output with an error of within 1 deg per rotation cycle T is required, a short sampling cycle of equal to or less than T/360 is required. For a second harmonic, the sampling cycle is equal to or less than T/720. A higher-order harmonic requires a shorter sampling cycle.

Then, the signal output from the second conversion processing section 411 and having only the steady-state response component is subtracted from the normal-resolution displacement signal X1(t), Y1(t), and then, a difference signal subjected to cancellation compensation of the steady-state response component is input to the switching control section 408. Such a signal is a signal corresponding to other components ux1(t), uy1(t) than the steady-state response component, and is represented by the same sign ux1(t), uy1(t) as that of other components than the steady-state response.

Although will be described in detail later, the switching control section 408 compares between the value of the signal ux1(t), uy1(t) and a predetermined threshold to switch the switching section 407 to the high-resolution displacement signal X1k(t), Y1k(t) or the normal-resolution displacement signal X1(*t*), Y1(*t*). In this manner, the switching section 407 outputs, as a displacement signal in the magnetic levitation control, the normal-resolution displacement signal X1(*t*), Y1(*t*) or the high-resolution displacement signal X1*k*(*t*), Y1*k*(*t*). Then, the steady-state response signal rx1×Re(exp (j$\omega$t)), ry1×Im(exp(j$\omega$t)) extracted in the steady-state response extraction section C is subtracted from the displacement signal output from the switching section 407. As a result, the signal corresponding to each of other components ux1(*t*), uy1(*t*) than the steady-state response in the expressions (1) and (2) is input to a PID control section 412 as a displacement signal used for the magnetic levitation control.

In the PID control section 412, proportional control, integral control, derivative control, phase correction, and other types of control compensation are performed based on the input displacement signal, thereby generating levitation control current settings. A PWM calculation section 413 is configured to generate a PWM control signal based on the levitation control current settings generated in the PID control section 412. The excitation amplifier 43 is driven based on the PWM control signal, and electromagnet current is supplied to the magnetic bearing electromagnet 45.

[Description of Thresholds and Switching Operation]

Figure 4:
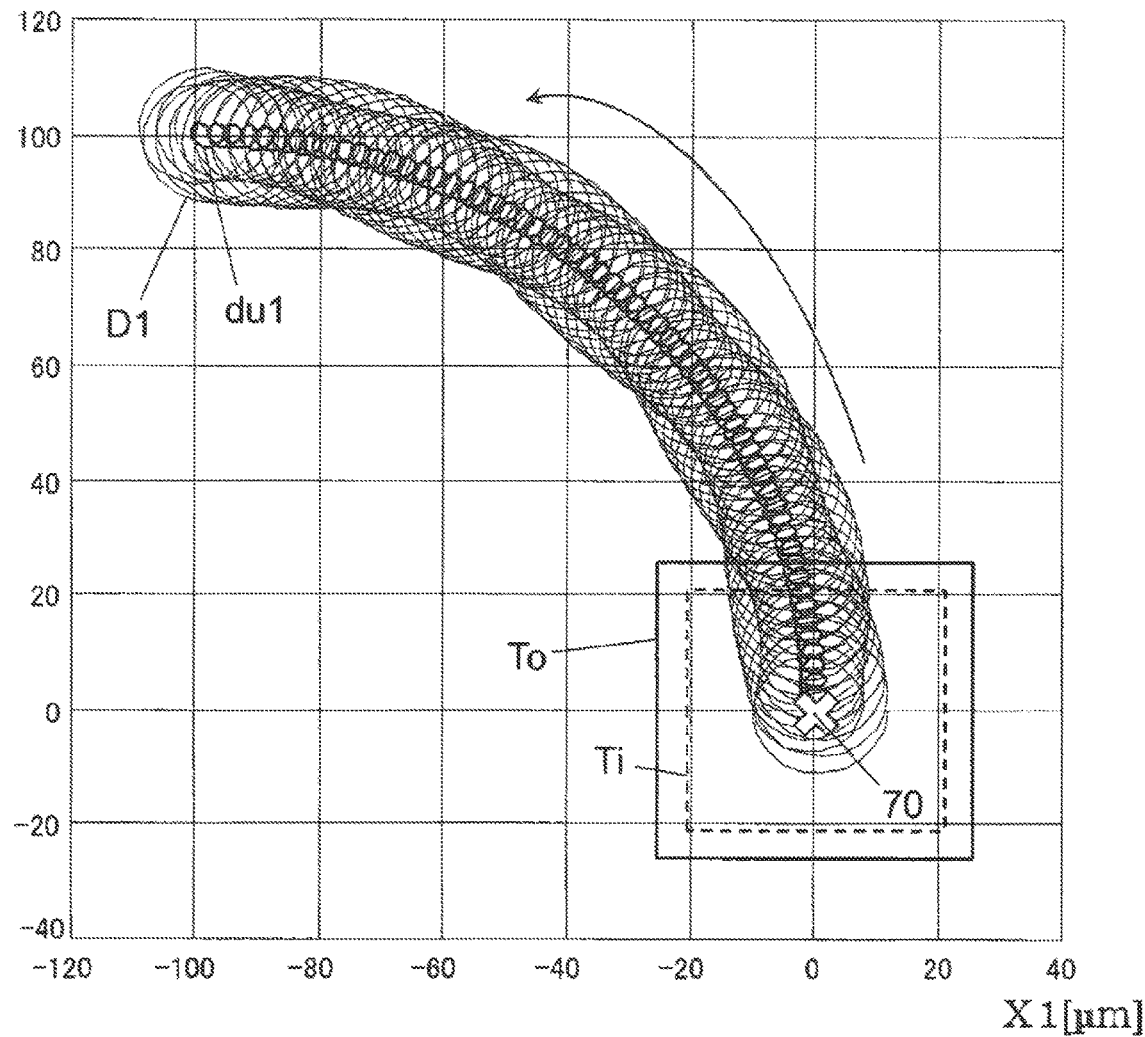
FIG. 4 is a graph of an example of an x1-axis displacement $X1(t)$ and a y1-axis displacement $Y1(t)$.

FIG. 4 is a graph of an example of the x1-axis displacement X1(*t*) and the y1-axis displacement Y1(*t*). The horizontal axis represents the x1-axis displacement X1(*t*), and the vertical axis represents the y1-axis displacement Y1(*t*). A locus D1 indicated by a thin line indicates the displacement (X1(*t*), Y1(*t*)), and a locus du1 indicated by a thick line indicates other components (ux1(*t*), uy1(*t*)) than the steady-state response. FIG. 4 shows the case where transient disturbance is applied to the rotor shaft 5 stably rotating at a rated rotation speed.

In FIG. 4, the rated rotation speed is 500 (rps), whirling has only a basic rotation component, and the whirling radius is 10 ($\mu$m). Moreover, the rotor is regarded as a rigid body, and precession and nutation of major free vibration particularly with low and high frequencies are additionally taken into consideration. The precession is rotation in a direction opposite to that of whirling, and has a natural frequency of 1 (Hz) and an amplitude of 100 ($\mu$m). The nutation is rotation in the same direction as that of whirling, and has a natural frequency of 240 (Hz) and an amplitude of 2 ($\mu$m).

A cross mark indicated by a reference numeral "70" indicates the target levitation position of the rotor shaft 5, and the coordinate of the cross mark is (0, 0). Before application of disturbance, the locus D1 shows circular movement around the target levitation position (0, 0). Upon application of transient disturbance, the loci D1, du1 change in a direction indicated by an arrow.

When transient disturbance is applied to the rotor shaft 5, the position of the rotor shaft 5 significantly changes as indicated by the locus D1 of FIG. 4. In the typical turbomolecular pump, a clearance of about 100 ($\mu$m) is ensured between each emergency mechanical bearing 66*a*, 66*b* and the rotor shaft 5. On the other hand, the whirling displacement of the rotor shaft 5 in the radial direction is generally about several ($\mu$m). Note that FIG. 4 shows the case where the whirling radius is a relatively-large value of 10 ($\mu$m) due to an imbalance increase caused by accumulation of a reactive product.

When the rotor shaft 5 stably rotates in the vicinity of the target levitation position, a rotor displacement detection range is not necessarily set to an entire clearance region, and the rotor displacement may be detected within a range slightly larger than a whirling range. On the other hand, when transient disturbance is applied, the rotor shaft 5 greatly displaces, as shown in FIG. 4, to such an extent that the rotor shaft 5 comes into contact with the mechanical bearings 66*a*, 66*b*. For this reason, for properly performing the magnetic levitation control, the rotor displacement needs to be detected across the entire clearance region.

Thus, in the present embodiment, the processing system A for obtaining the high-resolution displacement signal X1*k*(*t*), Y1*k*(*t*) and the processing system B for obtaining the normal-resolution displacement signal X1(*t*), Y1(*t*) are provided as illustrated in FIG. 3. When the level of the other components (ux1(*t*), uy1(*t*)) than the steady-state response exceeds the predetermined threshold due to disturbance application, the magnetic bearing control is performed using the normal-resolution displacement signal X1(*t*), Y1(*t*). On the other hand, when the level of the components (ux1(*t*), uy1(*t*)) falls within the predetermined threshold, e.g., when the rotor shaft 5 stably rotates in the vicinity of the target levitation position, the high-resolution displacement signal X1*k*(*t*), Y1*k*(*t*) with a higher resolution is used for the magnetic bearing control so that vibration reduction and quietness can be improved.

Figure 5:
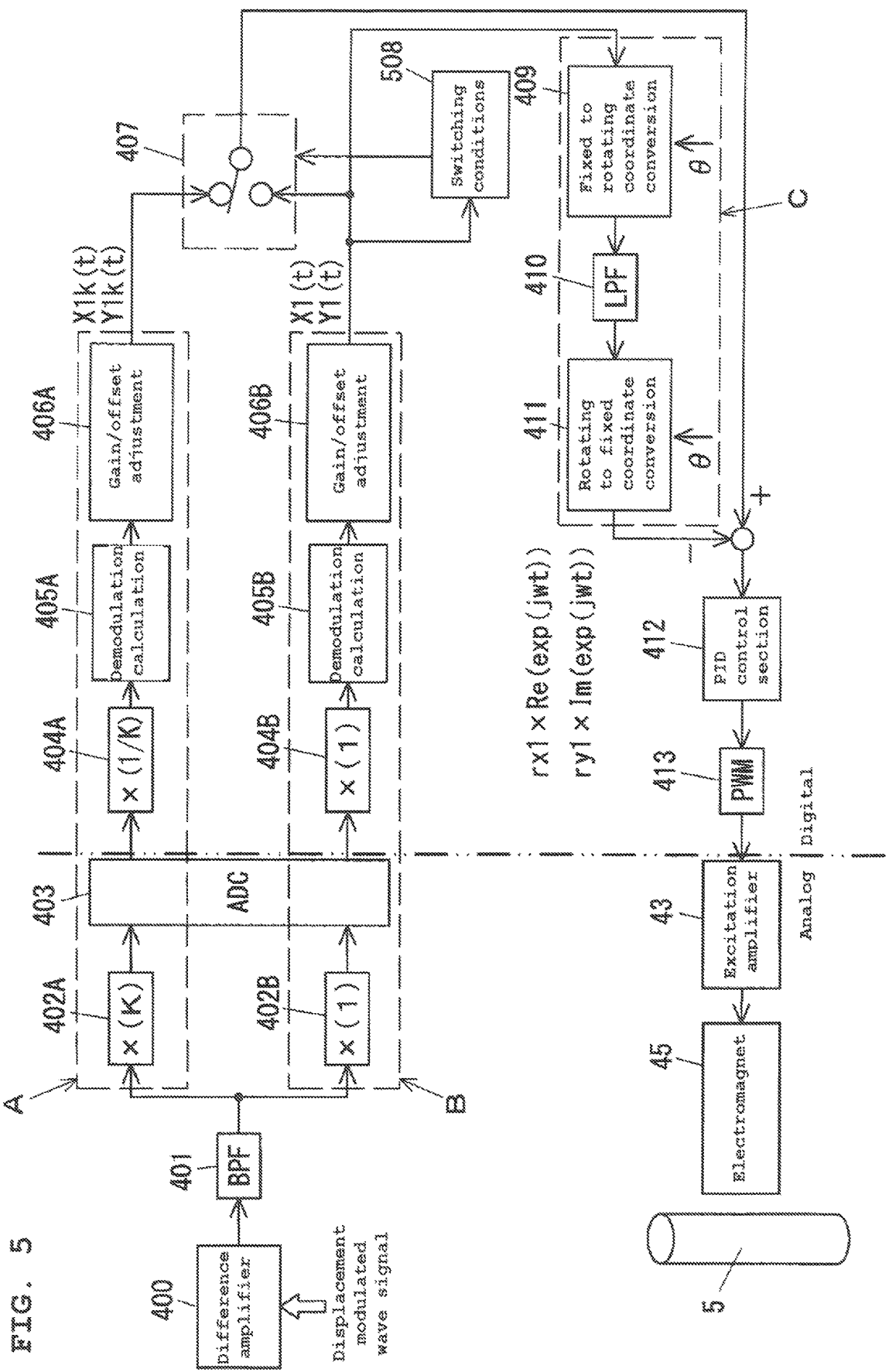
FIG. 5 is a diagram for describing a comparative example of the embodiment.

FIG. 5 is a diagram for describing a comparative example of the present embodiment. FIG. 5 is the block diagram corresponding to FIG. 3 described above, and the same reference numerals are used to represent equivalent elements. In the comparative example, a switching method by a switching section 407 is different, and the switching section 407 performs switching operation based on a switching command from a switching control section 508. Such a switching method is a method similar to a typical method described in Patent Literature 1.

In the switching control section 408 of the above-described embodiment, switching control is performed based on comparison among the signal ux1(*t*), uy1(*t*) and the thresholds. However, in the switching control section 508 of the comparative example, switching control is performed using a normal-resolution displacement signal X1(*t*), Y1(*t*) having a greater displacement than that of a signal ux1(*t*), uy1(*t*). For this reason, chattering as described later is easily caused.

Figure 6:
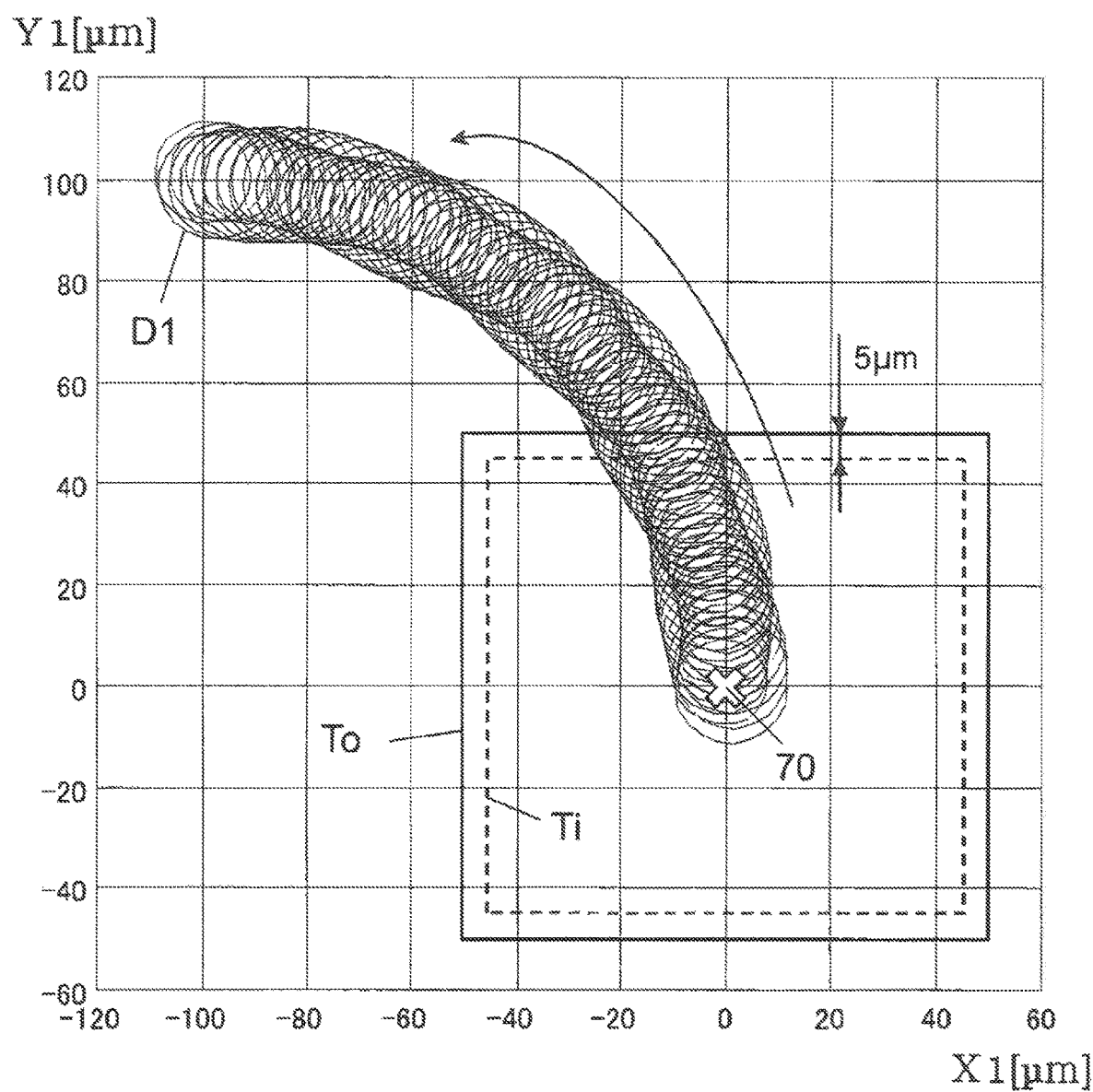
FIG. 6 is a graph for describing a relationship among a locus D1 of a displacement $(X1(t), Y1(t))$ and thresholds in the comparative example.

FIG. 6 is a graph for describing a relationship among a locus D1 of the displacement (X1(*t*), Y1(*t*)) and thresholds in the case of the comparative example. The locus D1 of FIG. 6 is the same as the locus D1 shown in FIG. 4. In the comparative example, the switching section 407 performs switching based on the normal-resolution displacement signal X1(*t*), Y1(*t*) instead of the signal ux1(*t*), uy1(*t*), and therefore, a locus du1 indicating other components (ux1(*t*), uy1(*t*)) than a steady-state response is not shown.

In FIG. 6, a solid rectangular line To and a dashed rectangular line Ti about a target levitation position 70 indicate an example of thresholds for the displacements X1(*t*), Y1(*t*) in the switching control section 508. The rectangular line To is hereinafter referred to as an "outer threshold To," and the rectangular line Ti is hereinafter referred to as an "inner threshold Ti." The outer threshold To is defined by a line segment indicating a threshold of X1=±50 ($\mu$m) for the x-axis displacement X1(*t*) and a line segment indicating a threshold of Y1=±50 ($\mu$m) for the y-axis displacement Y1(*t*). The inner threshold Ti is defined by a line segment indicating a threshold of X1=±45 ($\mu$m) for the x-axis displacement X1(*t*) and a line segment indicating a threshold of Y1=±45 ($\mu$m) for the y-axis displacement Y1(*t*).

Figure 7:
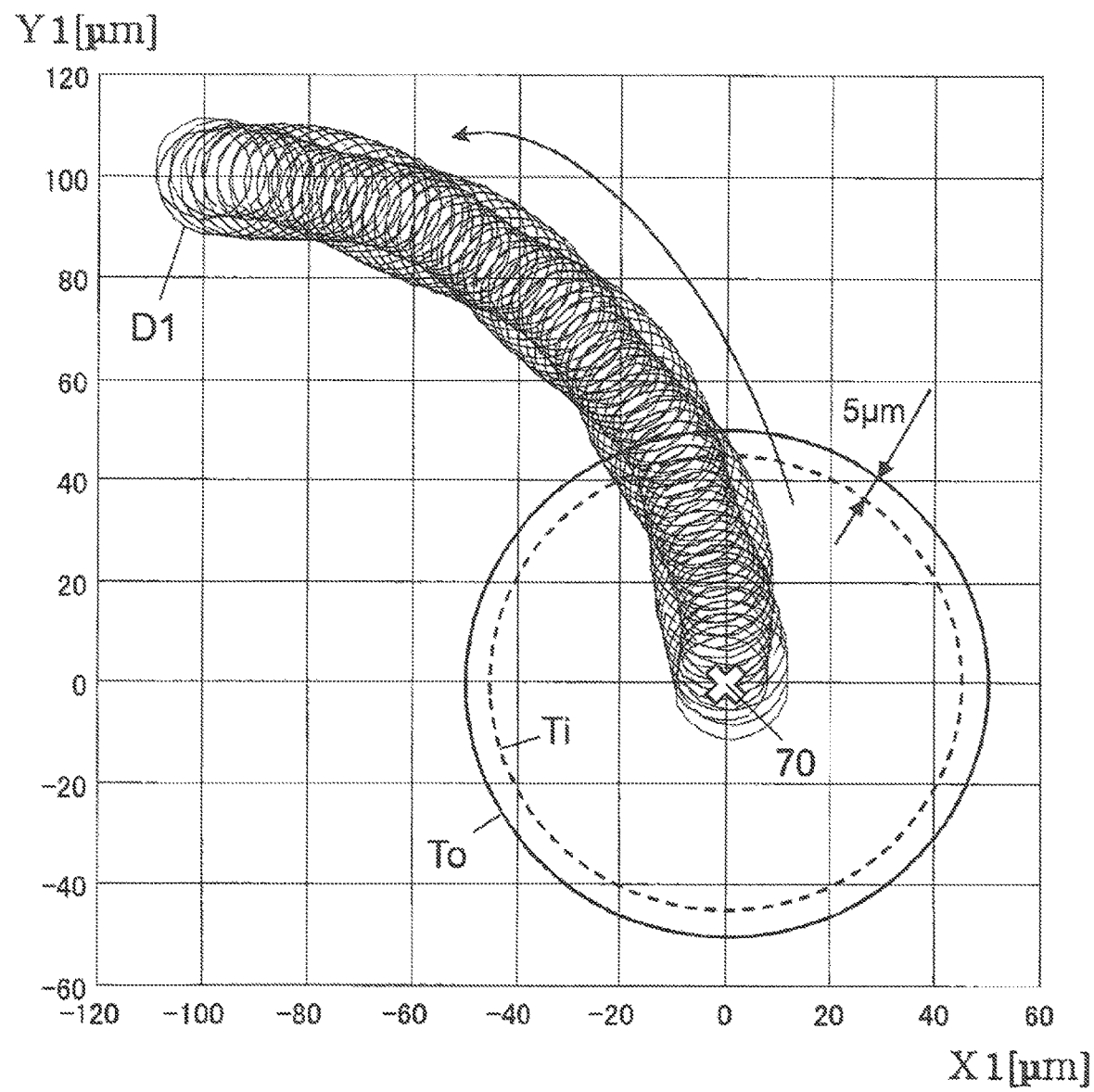
FIG. 7 is a graph in the case where thresholds To, Ti are indicated by circular lines.

Note that in the example shown in FIG. 6, the thresholds are set separately for the displacements X1(*t*), Y1(*t*), but thresholds To, Ti indicated by circular lines with a distance of $r(t)=\sqrt{(X1(t)^2+Y1(t)^2)}$ from the target levitation position (0, 0) may be set as shown in FIG. 7. In this case, the switching control section 508 calculates a distance r(t) from the input normal-resolution displacement signals X1(t), Y1(t), and then, compares among the calculated value and the thresholds To, Ti (the radiuses of the circular lines).

The switching control section 508 performs the following switching control according to the outer threshold To and the inner threshold Ti as shown in FIGS. 6 and 7. When vibration is small without action of transient disturbance, the locus D1 is positioned on the inside of the line indicating the inner threshold Ti. In this case, the high-resolution displacement signal is selected as a displacement signal used for magnetic levitation control. When the locus D1 moves from the inside to the outside of the line indicating the outer threshold To due to application of transient disturbance, the displacement signal is switched from the high-resolution displacement signal X1k(t), Y1k(t) to the normal-resolution displacement signal X1(t), Y1(t). Once the locus D1 moves to the inside of the inner threshold Ti after having moved to the outside of the outer threshold To, the normal-resolution displacement signal X1(t), Y1(t) is switched to the high-resolution displacement signal X1k(t), Y1k(t).

In the case of the thresholds To, Ti indicated by the rectangular lines shown in FIG. 6, when at least one of the displacements X1(t), Y1(t) moves to the outside of the rectangular line indicating the outer threshold To, the high-resolution displacement signal X1k(t), Y1k(t) is switched to the normal-resolution displacement signal X1(t), Y1(t). Then, after at least one of the displacements X1(t), Y1(t) has moved to the outside of the rectangular line To and the displacement signal has been switched to the normal-resolution displacement signal X1(t), Y1(t), when the at least one of the displacements X1(t), Y1(t) moves to the inside of the rectangular line indicating the inner threshold Ti, the displacement signal is switched to the high-resolution displacement signal X1k(t), Y1k(t) again.

There is a hysteresis between the thresholds provided as the outer threshold To and the inner threshold Ti as described above. This is because of the purpose of preventing chattering caused due to repeated crossing of the displacement X1(t), Y1(t) over a single threshold. In the case of settings of the thresholds To, Ti shown in FIG. 6, when a whirling radius is less than ½ of a width between the rectangular line To and the rectangular line Ti, i.e., when the whirling radius is less than 5/2 (μm), occurrence of chattering can be prevented when the locus D1 passes over the lines of the thresholds To, Ti.

However, in the case of the comparative example of FIG. 5, the switching control is performed using the normal-resolution displacement signal X1(t), Y1(t). Thus, when the whirling radius is greater than 5/2 (μm) as in the example shown in FIG. 6, operation is repeated such that the locus D1 passes over the lines of the thresholds To, Ti from the inside to the outside and from the outside to the inside, and as a result, chattering is caused.

FIGS. 8A and 8B are graphs for describing occurrence of chattering when the displacements (X1(t), Y1(t)) change as shown in FIG. 6. FIG. 8A shows a temporal change in the x-axis displacement X1(t) and the y-axis displacement Y1(t), and FIG. 8B shows a temporal change in a switching state of the switching section 407. In FIG. 8B, a state (+1) is the state in which the switching section 407 selects the normal-resolution displacement signal X1(t), Y1(t), and a state (−1) is the state in which the switching section 407 selects the high-resolution displacement signal X1k(t), Y1k(t).

As shown in FIG. 6, the locus D1 shows a spiral combined locus of circular motion having a radius of 10 (μm) due to whirling and represented by rx1×Re(exp(jωt)), ry1×Im(exp(jωt)) in the expressions (1) and (2) and a displacement caused due to disturbance and represented by ux1(t), uy1(t). The center of the circular motion changes from the target levitation position 70 to a position of X1=−100 (μm), Y1=−100 (μm). FIG. 8A shows the temporal change in the displacement X1(t), Y1(t) in this case. The x-axis displacement X1(t) changes from 0 (μm) to −100 (μm) under the presence of minute vibration due to whirling. Similarly, the y-axis displacement Y1(t) changes from 0 (μm) to 100 (μm) under the presence of minute vibration due to whirling. The amplitude of the minute vibration in association with the displacement X1(t), Y1(t) is about 20 (μm) which is about twice as large as the whirling radius.

In a range indicated by a reference character "E1," both of the displacements X1(t), Y1(t) are within the outer threshold To (=±50 μm). Thus, the switching section 407 is maintained at the state (−1), and the high-resolution displacement signal X1k(t), Y1k(t) is selected. In a range indicated by a reference character "E2," the y-axis displacement Y1(t) is in such a state that the y-axis displacement Y1(t) moves in and out between the outside of the outer threshold To and the inside of the inner threshold Ti, and chattering leading to repetition of the state (−1) and the state (+1) is caused. That is, the switching section 407 repeatedly alternately outputs the high-resolution displacement signal X1k(t), Y1k(t) and the normal-resolution displacement signal X1(t), Y1(t). In a range indicated by a reference character "E3," the y-axis displacement Y1(t) having exceeded the outer threshold To once becomes no longer equal to or less than the inner threshold Ti. Thus, the switching section 407 is maintained at the state (+1), and the normal-resolution displacement signal X1(t), Y1(t) is selected.

As described above, in the case of the comparative example, whirling is greater than a hysteresis width between the thresholds To, Ti, and chattering is caused because the locus D1 crosses over two thresholds To, Ti with hysteresis. In the case of a turbo-molecular pump, the rotation speed of the rotor shaft 5 is high, and a whirling displacement frequency is high. Thus, switching between a normal-resolution displacement signal and a high-resolution displacement signal is repeated in a short cycle.

Figure 9:
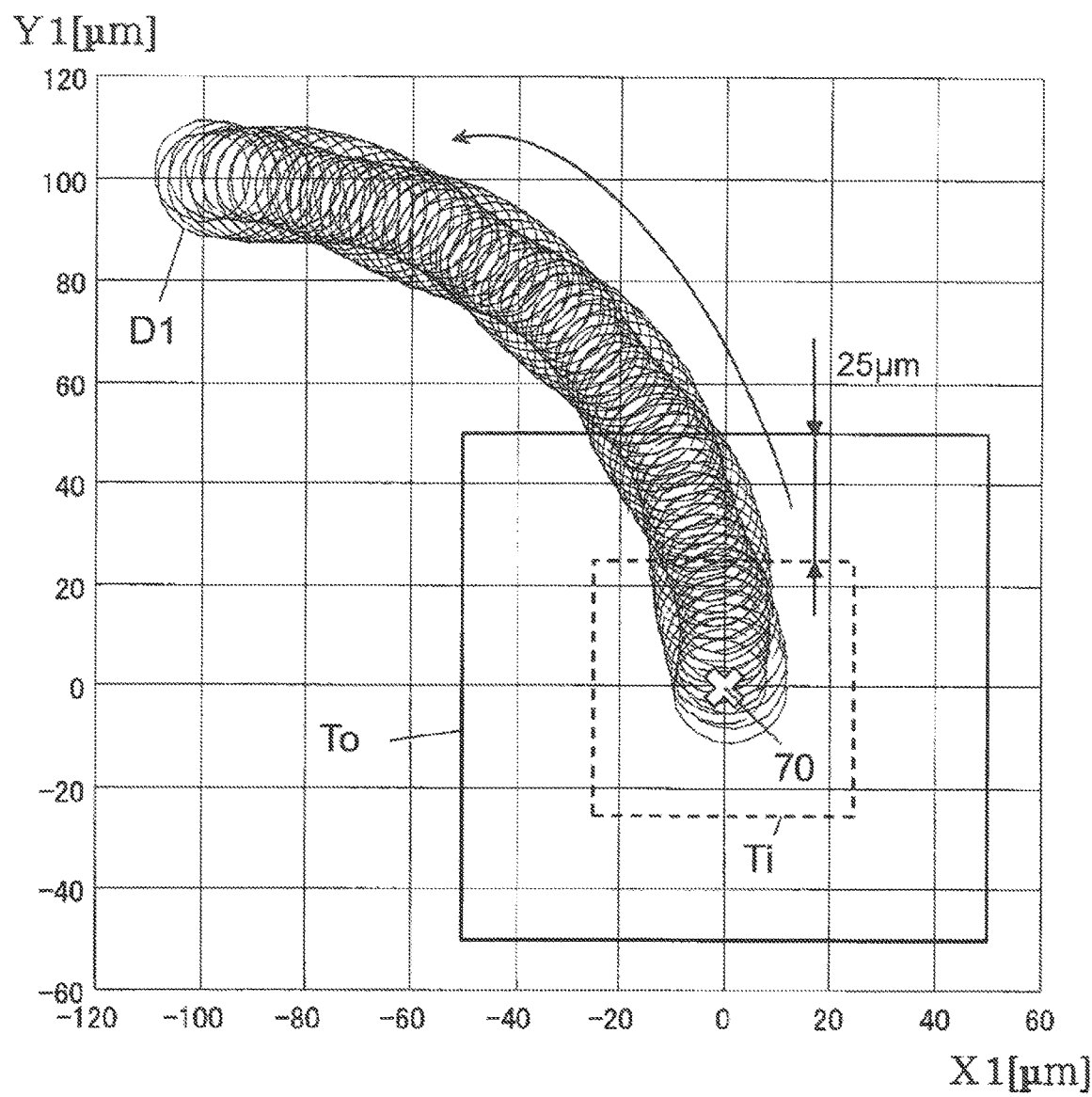
FIG. 9 is a graph for describing the case of preventing occurrence of chattering by an increase in a hysteresis width.

In the case of the comparative example with a great whirling radius, it is required for preventing occurrence of chattering as described above to increase the hysteresis width between the thresholds To, Ti as shown in FIG. 9. In FIG. 9, the inner threshold Ti is changed to Y1=±25 (μm) without changing the outer threshold To, and the hysteresis width between the thresholds To, Ti is 25 (μm). In this case, the hysteresis width is equal to or greater than the two fold (20 μm) of the whirling radius, and therefore, occurrence of chattering can be prevented.

Figure 10A:
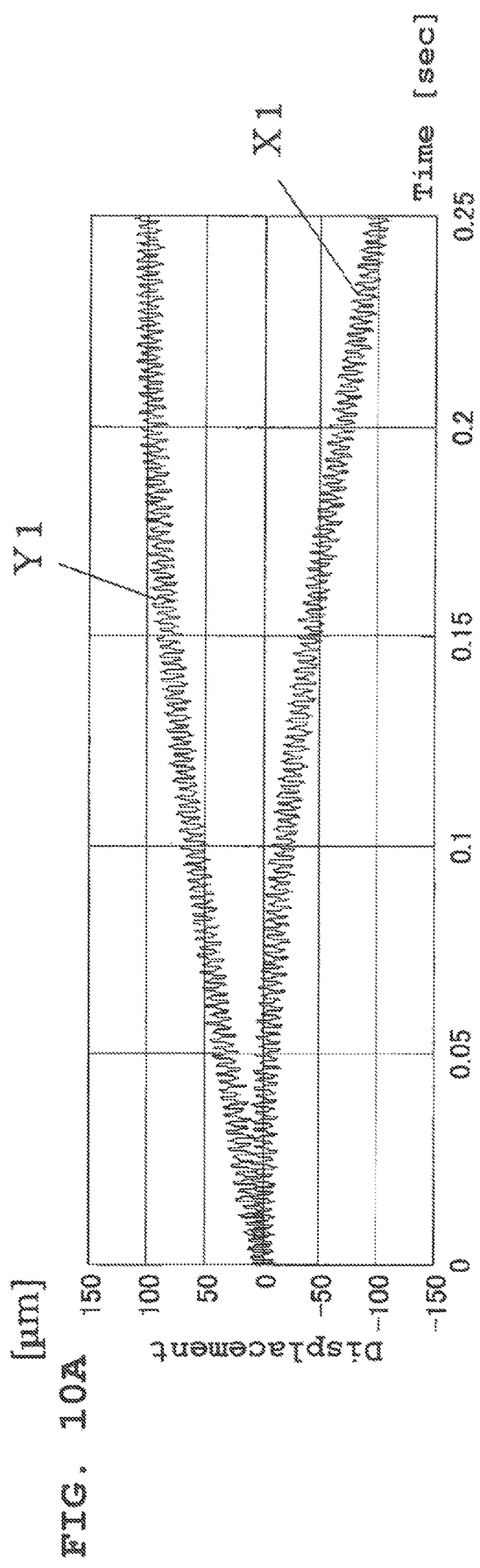
FIGS. 10A and 10B are graphs of a switching status in the case of changing the inner threshold Ti to increase the hysteresis width.
Figure 10B:
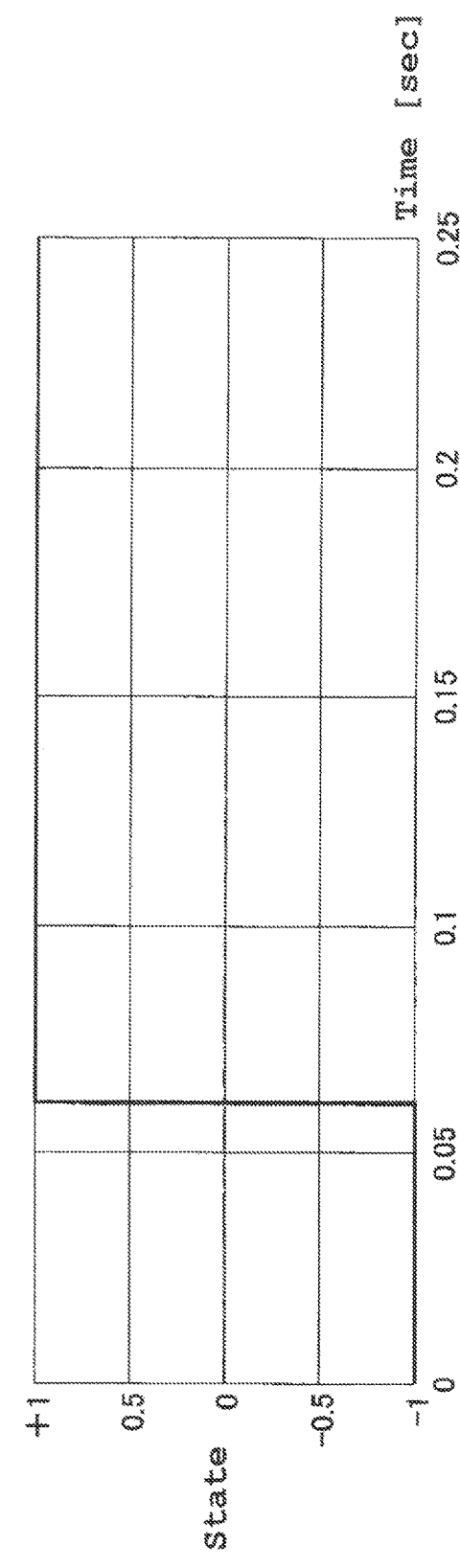

FIGS. 10A and 10B are graphs showing a switching status when the inner threshold Ti is changed as shown in FIG. 9. FIG. 10A is the graph showing a temporal change in the displacement X1(t), Y1(t), and is the same as FIG. 8A. FIG. 10B is the graph showing a switching state, and shows that chattering is eliminated. As described above, in the case of a great whirling radius, the hysteresis width between the outer threshold To and the inner threshold Ti needs to be set greater.

On the other hand, in the switching control section 408 of the above-described embodiment, the switching control is performed based on comparison among other components $ux1(t)$, $uy1(t)$ than the steady-state response and the thresholds instead of using the displacements $X1(t)$, $Y1(t)$, and therefore, the hysteresis width can be set smaller as compared to the case of the comparative example.

Note that in the case of the above-described locus du1 shown in FIG. 4, the precession and the nutation of the major free vibration particularly with the low and high frequencies are additionally taken into consideration as other components than the steady-state response. The precession is the rotation in the direction opposite to that of whirling, and has a natural frequency of 1 (Hz) and an amplitude of 100 (μm). The nutation is the rotation in the same direction as that of whirling, and has a natural frequency of 240 (Hz) and an amplitude of 2 (μm).

Note that a value set as the inner threshold is unrelated to occurrence of chattering, and the inner threshold in the present embodiment is, as described below, set equivalent to the above-described comparative example (see FIG. 9) where chattering is eliminated. The inner threshold is 25 (μm) in the comparative example of FIG. 9. This is the case where the inner threshold is a displacement when a whirling amplitude as the steady-state response is 10 (μm), a nutation amplitude other than the steady-state response is 2 (μm), and a displacement due to the above-described precession with an amplitude of 100 (μm) is 13 (μm). That is, the inner threshold is set to 25 (μm)={10+2+13} (μm). On the other hand, in the present embodiment, only other components than the steady-state response are taken into consideration. Thus, when the same nutation amplitude of 2 (μm) and the same precession amplitude of 13 (μm) are used, the inner threshold is the sum of these values, i.e., 15 (μm).

The outer threshold is a value obtained by adding a hysteresis value to the inner threshold. In the case of the comparative example shown in FIG. 9, 25 (μm) is employed as the hysteresis value, and the outer threshold is 50 (μm). In a breakdown of 25 (μm), a margin of 1 (μm) is further added to a value obtained by doubling the sum of the amplitude of high-frequency whirling motion (the steady-state response) and the amplitude of the nutation (the component other than the steady-state response). That is, 25 (μm)={(10+2)×2+1} (μm). In the case of the present embodiment, only other components than the steady-state response are taken into consideration, and therefore, 5 (μm) obtained by adding a similar margin of 1 (μm) to the two fold of the amplitude of the nutation other than the steady-state response, i.e., the two fold of 2 (μm), is taken as the hysteresis value. The outer threshold is 20 (μm) obtained by adding a hysteresis value of 5 (μm) to an inner threshold of 15 (μm).

Figure 11:
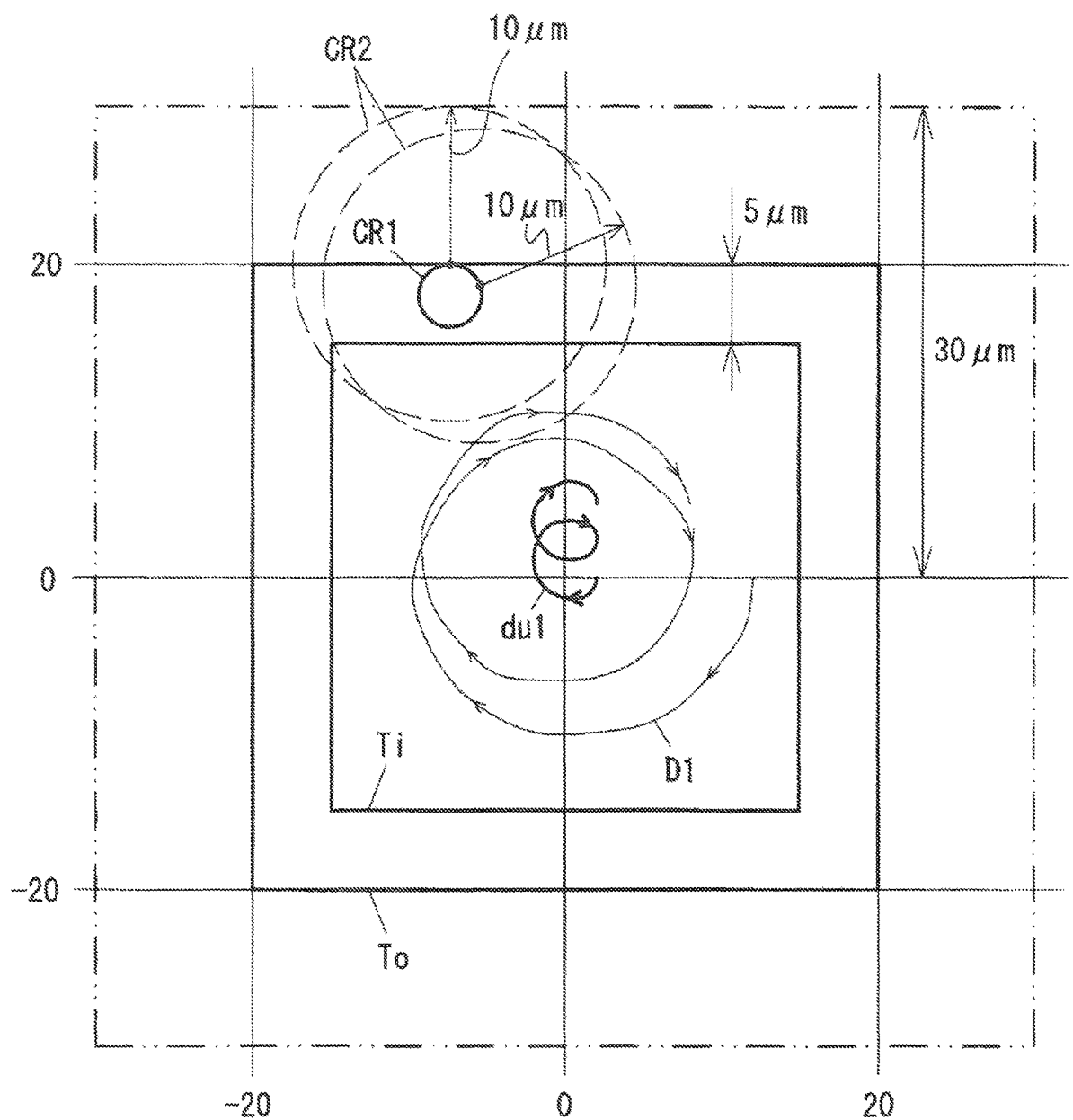
FIG. 11 is a graph of the loci D1, du1 in an adjacent region including a coordinate (0, 0) of FIG. 4.

As described above, the inner and outer thresholds of the present embodiment under the conditions equivalent to an inner threshold of 25 (μm) and an outer threshold of 50 (μm) in FIG. 9 are 15 (μm) and 20 (μm), respectively. FIG. 11 is a graph of the loci D1, du1 in an adjacent region including a coordinate of (0, 0) with the inner threshold Ti and the outer threshold To in FIG. 4 being replaced with 15 (μm) and 20 (μm).

In the present embodiment, the outer threshold To and the inner threshold Ti are applied to the locus du1, and therefore, the hysteresis width is, as described above, set by adding a margin of 1 to the two fold of the nutation amplitude. Circles CR1, CR2 illustrated on an upper side of the rectangular lines indicating the thresholds To, Ti indicate a locus of the nutation and a locus of the whirling motion when the precession is regarded as zero. The locus D1 of the displacement $X1(t)$, $Y1(t)$ is a locus when the precession, the nutation, and the whirling motion are combined together.

Figure 26A:
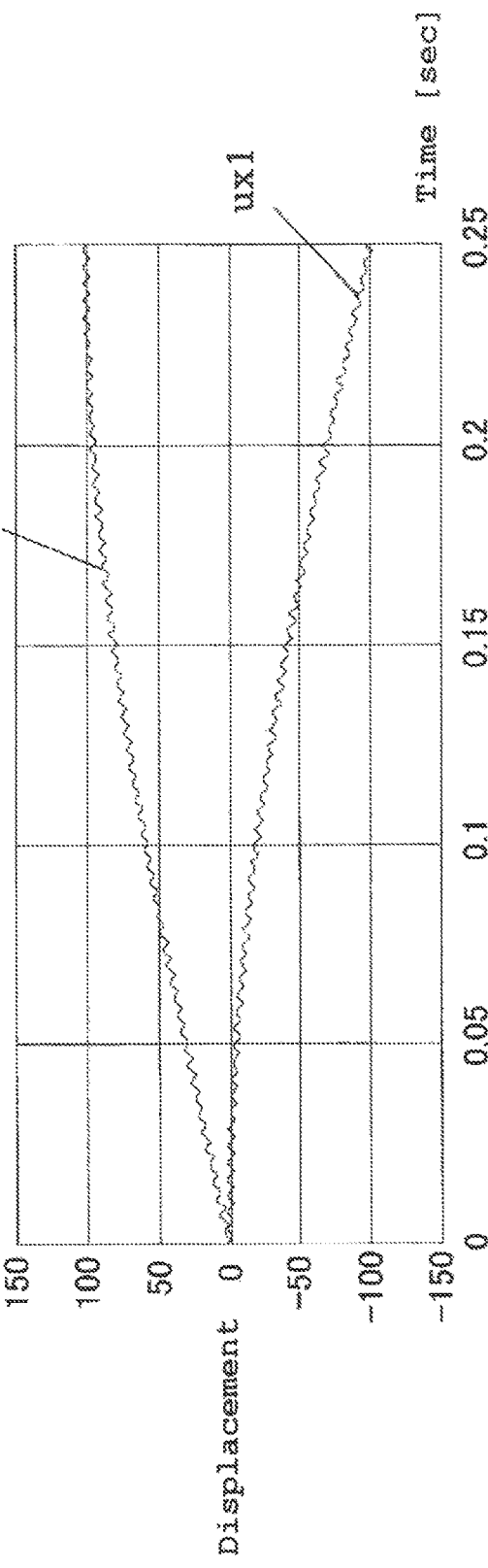
FIGS. 26A and 26B are graphs of the switching status in the first embodiment.
Figure 26B:
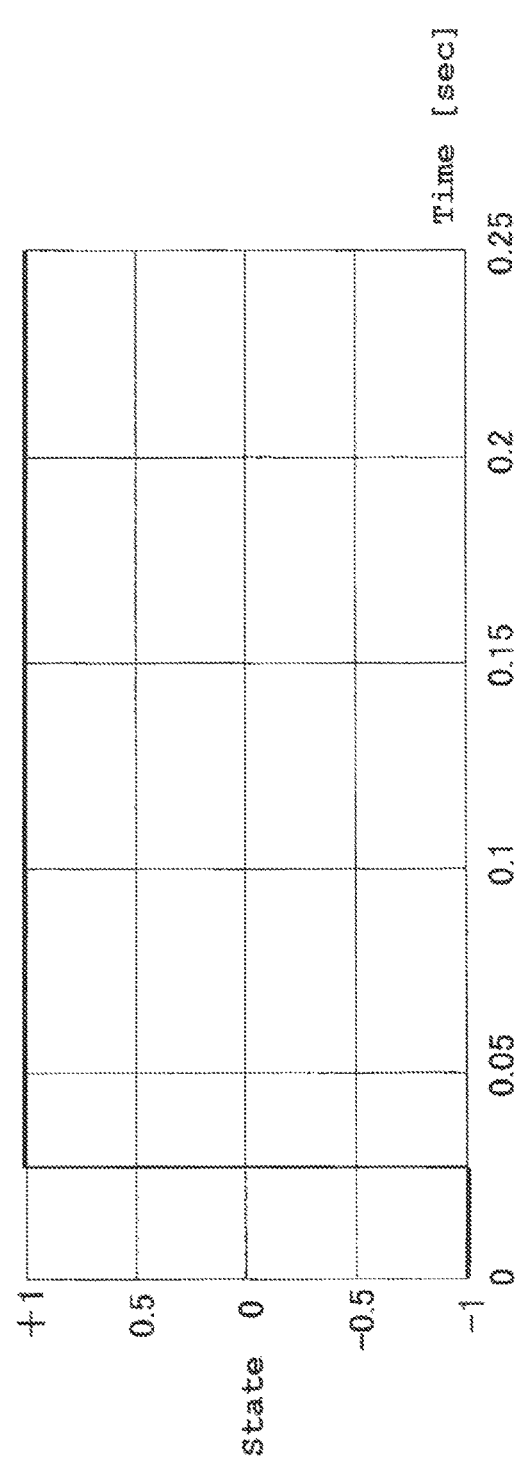

Since the nutation amplitude is 2 (μm), the diameter of the circle CR1 is 4 (μm). Since the whirling radius is 10 (μm), the diameter of the circle CR2 is 20 (μm). In the case of setting the thresholds Ti, To as shown in FIG. 11, when the circle CR1 moves from the inside of the rectangular line indicating the inner threshold Ti to the outside of the rectangular line indicating the outer threshold To due to application of transient disturbance, occurrence of chattering can be prevented. FIGS. 26A and 26B are graphs of the switching status in the case of the present embodiment. FIG. 26A is the graph showing a temporal change in $ux1(t)$, $uy1(t)$, and shows a smaller minute-vibration amplitude than those of $X1(t)$, $Y1(t)$ shown in FIGS. 8A, 8B, 10A, and 10B. As a result, no chattering is caused as shown in FIG. 26B.

As described above, $ux1(t)$, $uy1(t)$ are used for switching determination. Thus, even when the whirling radius increases due to, e.g., accumulation of the reactive product on the rotor 4, the hysteresis width between the thresholds Ti, To can be suppressed small, and the outer threshold To can be suppressed slightly larger than the whirling radius. Moreover, since $ux1(t)$, $uy1(t)$ are used for switching determination, chattering can be, in the case of a pump having extremely-small $ux1(t)$, $uy1(t)$, suppressed to a short period of time even when no hysteresis is provided for the thresholds.

In the comparative example shown in FIG. 9, switching to the normal-resolution displacement signal is performed when the displacement $X1(t)$, $Y1(t)$ exceeds ±50 (μm). That is, until the displacement $X1(t)$, $Y1(t)$ reaches ±50 (μm), the high-resolution displacement signal with the resolution multiplying factor K is used. On the other hand, in the present embodiment shown in FIG. 11, switching to the normal-resolution displacement signal is performed when $ux1(t)$, $uy1(t)$ exceeds ±20 (μm). In this case, the whirling radius is 10 (μm), and therefore, the high-resolution displacement signal with the resolution multiplying factor K is used until the displacement $X1(t)$, $Y1(t)$ reaches ±30 (μm). That is, the high-resolution displacement signal is used within a rectangular range indicated by a chain double-dashed line of FIG. 11. Thus, the resolution multiplying factor K can be set to about 1.7 times (≈50/30) as large as that of the comparative example. Consequently, the high-resolution displacement signal can have a higher resolution, leading to vibration reduction.

Moreover, the hysteresis width can be decreased, and therefore, a margin in setting of the hysteresis width increases by such a hysteresis width decrease. Thus, even when there is a certain degree of target levitation position offset error between the normal-resolution displacement signal and the high-resolution displacement signal, a slightly-greater hysteresis width is set for the circle CR1 of FIG. 11, and therefore, occurrence of chattering due to the offset error can be easily avoided.

(Method for Setting Resolution Multiplying Factor K)

Next, the method for setting the resolution multiplying factor K will be described with reference to FIGS. 12A and 12B. FIG. 12A shows the case of the comparative example, and FIG. 12B shows the case of the present embodiment.

In the processing system B for the normal-resolution displacement signal, when the rotor shaft 5 contacts the mechanical bearings 66a, 66b, the signal input to the AD converter 403 of FIG. 3 is set such that the range of the signal multiplied by (+1)-fold in the amplification section 402B becomes equal to the full scale of the AD converter 403. Moreover, in the processing system A for the high-resolution displacement signal, when the whirling displacement $X1(t)$, $Y1(t)$ becomes equal to the outer threshold To, the signal input to the AD converter 403 of FIG. 3 is set such that the range of the signal multiplied by (+K)-fold in the amplification section 402A becomes equal to the full scale of the AD converter 403. Note that there is a clearance variation as an error such as rattling of the emergency mechanical bearing, and therefore, the full scale is preferably set considering such an error.

The above-described outer threshold To can be optionally set to some extent. However, for reducing vibration by the resolution multiplying factor K increased as much as possible, the outer threshold To is preferably set to a small value. In the case of the comparative example, the thresholds Ti, To need to be set as in the following expressions (6), (7) for preventing chattering (see FIG. 12A):

$$Ti \geq \text{(Whirling Radius)} \quad (6)$$

$$To \geq \text{(Whirling Radius)} \times 3 \quad (7)$$

Note that in description made herein, the nutation amplitude is regarded as negligibly small. The nutation amplitude is unrelated to the whirling displacement, and for this reason, there is no problem when it is considered as follows in the case of a great whirling displacement due to, e.g., accumulation of the reactive product.

If a nominal clearance between the rotor shaft 5 and each mechanical bearing 66a, 66b is 100 (μm), the whirling radius (=10 μm) is 1/10 of the nominal clearance. At this point, the resolution multiplying factor K is, as in an expression of (1/10)×3×K≤1, set such that the K-fold of the range of the outer threshold To is equal to or less than the nominal clearance. Thus, the resolution multiplying factor K is set as in the following expression (8):

$$K \leq 10/3 \quad (8)$$

In the present embodiment, when the nutation displacement $ux1$, $uy1$ is regarded as zero, settings of the thresholds Ti, To causing no chattering are as in the following expression (9) (see FIG. 12B). As in the case of the comparative example, the resolution multiplying factor K is set such that the K-fold of the range of the outer threshold To is equal to or less than the nominal clearance. When the whirling radius is (1/10) of the nominal clearance, the resolution multiplying factor K is set as in the following expression (10):

$$To \geq Ti \geq \text{(Whirling Radius)} \quad (9)$$

$$K \leq 10/1 \quad (10)$$

The resolution multiplying factor K is set as in the following expression (11). Thus, a greater resolution multiplying factor K than that of the case of the comparative example can be set, and therefore, vibration can be reduced. Generally, when the whirling radius is the a-fold of the nominal clearance, the expression (11) can be deformed to an expression (12).

$$10/3 < K \leq 10/1 \quad (11)$$

$$1/(3\alpha) < K \leq 1/\alpha \quad (12)$$

(Variation)

Figure 13:
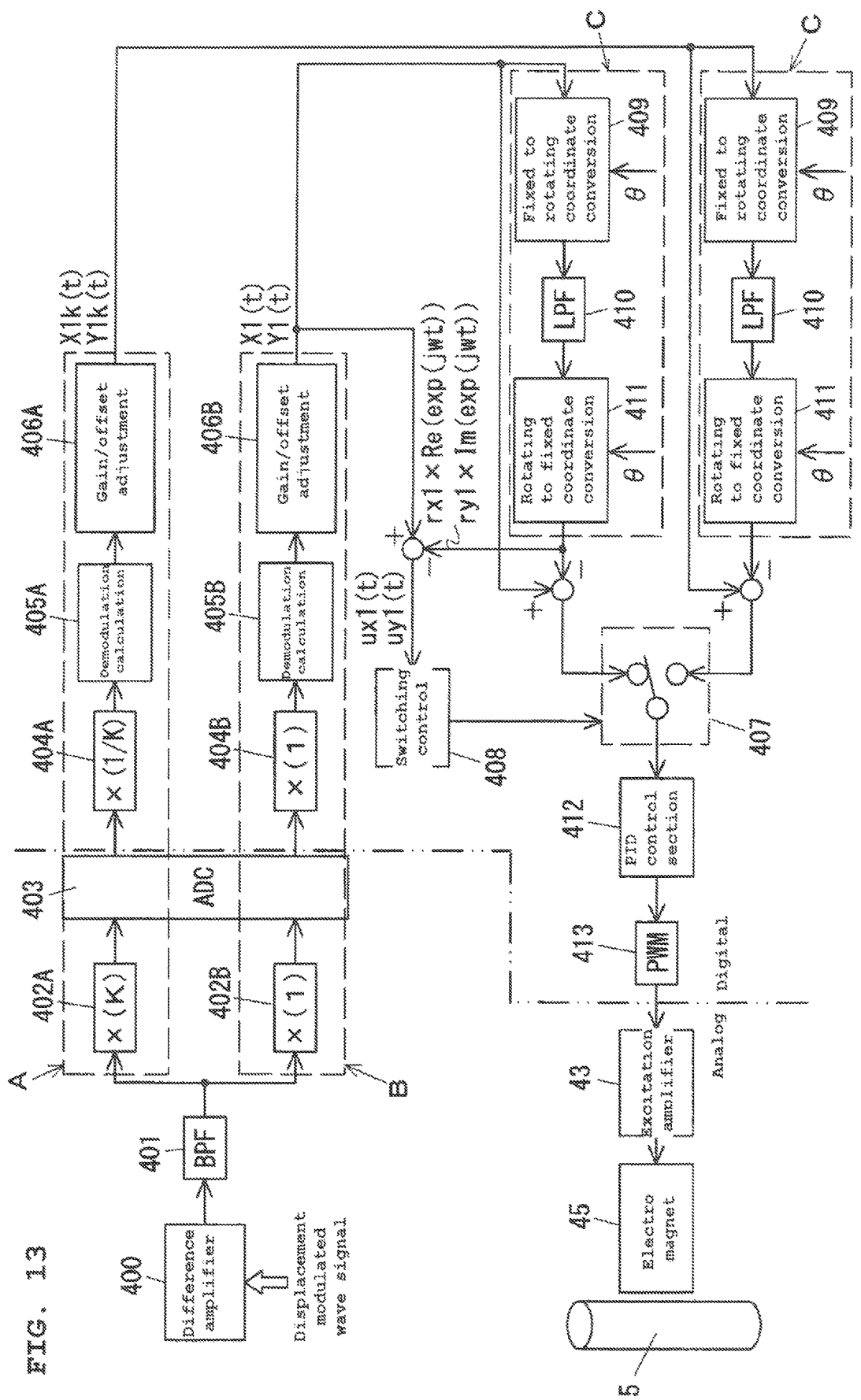
FIG. 13 is a diagram of a variation of the first embodiment.

FIG. 13 is a variation of the first embodiment described above. In the configuration of the first embodiment illustrated in FIG. 3, steady-state response extraction is performed using the normal-resolution displacement signal $X1(t)$, $Y1(t)$ of the processing system B, and then, cancellation compensation of the steady-state response component is, using the above-described signal subjected to steady-state response extraction, performed for the normal-resolution displacement signal $X1(t)$, $Y1(t)$ and the high-resolution displacement signal $X1k(t)$, $Y1k(t)$.

On the other hand, in the variation illustrated in FIG. 13, it is configured such that the steady-state response extraction section C is provided at each line of the processing systems A, B and that the switching section 407 performs switching between the normal-resolution and high-resolution displacement signals subjected to cancellation compensation of the steady-state response component. As in the case of the above-described embodiment, the switching control section 408 performs the switching control based on comparison among other components $ux1(t)$, $uy1(t)$ than the steady-state response obtained from the normal-resolution displacement signal and the thresholds.

In the variation, the steady-state response component extracted from the high-resolution displacement signal is used for steady-state response cancellation compensation for the high-resolution displacement signal. Thus, in the case of selecting the high-resolution displacement signal, an error in the steady-state response is also reduced. That is, a vibration peak of a rotation component or a harmonic component thereof in a vibration spectrum is reduced.

As described above, in the present embodiment, the following systems are provided as illustrated in FIG. 3: the processing system A as a first displacement signal generation section configured to generate, based on the amplified signal, the high-resolution displacement signal $X1k(t)$, $Y1k(t)$ in the region being equivalent to a first displacement region including the predetermined position and defined by the outer threshold To, the amplified signal being obtained in such a manner that the difference signal between the displacement modulated wave signals modulated according to a displacement from a predetermined position of the rotor is amplified by the resolution multiplying factor K (not that K>1) in the amplification section 402A; and the processing system B as a second displacement signal generation section configured to generate, based on the difference signal between the displacement modulated wave signals, the normal-resolution displacement signal $X1(t)$, $Y1(t)$ in the clearance region equivalent to a larger second displacement region including the first displacement region. Then, based on an unsteady-state response signal $ux1(t)$, $uy1(t)$ obtained by excluding the steady-state whirling displacement component $rx1 \times \text{Re}(\exp(j\omega t))$, $ry1 \times \text{Im}(\exp(j\omega t))$ from the normal-resolution displacement signal $X1(t)$, $Y1(t)$, the switching control section 408 selects either one of the high-resolution displacement signal $X1k(t)$, $Y1k(t)$ or the normal-resolution displacement signal $X1(t)$, $Y1(t)$, and then, controls the switching section 407.

Note that the predetermined position as an origin of the displacement in each axis is normally set to the center of each emergency mechanical bearing. In the present invention, the target levitation position is not necessarily coincident with the predetermined position, but the case where the target levitation position is coincident with the predetermined position is described in the embodiments.

The signal $ux1(t)$, $uy1(t)$ is unrelated to the whirling displacement. Even when the whirling displacement increases due to, e.g., accumulation of the reactive product, the signal $ux1(t)$, $uy1(t)$ is not susceptible to such an increase. Thus, even when a great whirling displacement is allowed, a greater resolution multiplying factor K can be set as compared to the case of performing the switching control using the whirling displacement, and as a result, vibration reduction of the pump can be improved.

Note that in the configuration illustrated in FIG. 3, the unsteady-state response signal $ux1(t)$, $uy1(t)$ is calculated by excluding the steady-state whirling displacement component from the normal-resolution displacement signal $X1(t)$, $Y1(t)$, but the high-resolution displacement signal $X1k(t)$, $Y1k(t)$ may be used instead of the normal-resolution displacement signal $X1(t)$, $Y1(t)$.

Moreover, in the present embodiment, the case where the displacement sensor 49 is used as a displacement detection section configured to detect the displacement from the predetermined position has been described as an example. However, the present invention is applicable to a vacuum pump employing a so-called "sensor-less (also called "self-sensing")" magnetic bearing. In the case of the sensor-less magnetic bearing, a sensor carrier signal is superimposed on electromagnetic current, and the sensor carrier signal superimposed by displacement of the rotor shaft 5 is subjected to displacement modulation. Demodulation processing is performed for the displacement modulated wave signal, thereby generating a displacement signal.

Note that when the configuration illustrated in FIG. 3 is also applied to other three axes (the x2-axis, the y2-axis, and the z-axis) and as a result, is applied to all of five axes, the maximum effect can be achieved. However, this configuration may be applied to four radial axes for which imbalance compensation is normally performed, or the number of axes may be decreased according to individual's special characteristics for each application of the vacuum pump, for example.

Moreover, in the configuration illustrated in FIG. 3, the magnetic bearing control is performed using other components $ux1(t)$, $uy1(t)$ than the steady-state response, the components $ux1(t)$, $uy1(t)$ being obtained by excluding the steady-state response component $rx1 \times Re(exp(j\omega t))$, $ry1 \times Im(exp(j\omega t))$ from the displacement signal $X1(t)$, $Y1(t)$ or $X1k(t)$, $Y1k(t)$. However, it may be configured such that the magnetic bearing control is performed using the displacement signal $X1(t)$, $Y1(t)$ or $X1k(t)$, $Y1k(t)$.

Second Embodiment

Figure 14:
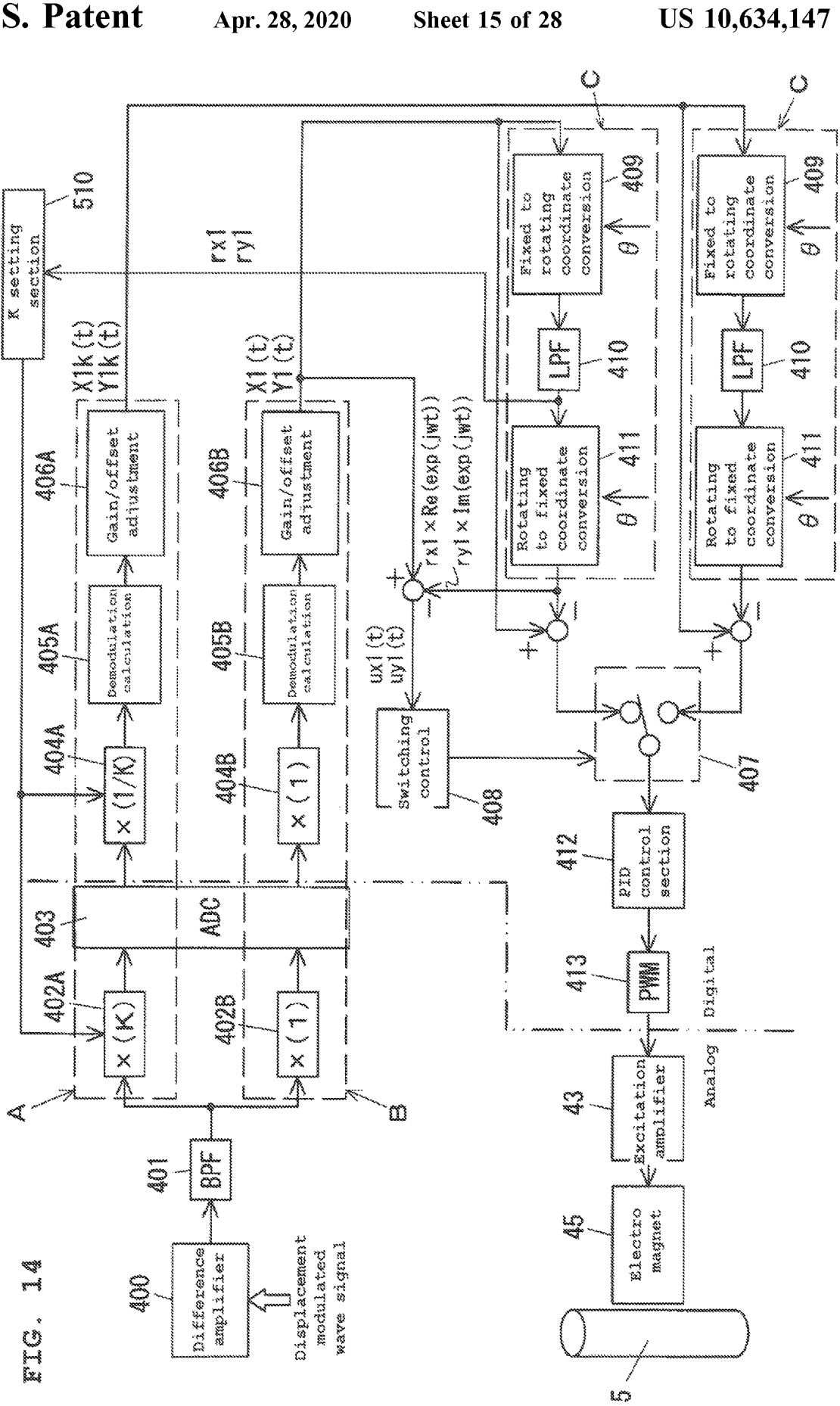
FIG. 14 is a diagram for describing a second embodiment of the present invention.

FIG. 14 is a diagram for describing a second embodiment of the present invention, and a K setting section 510 is added to the configuration illustrated in FIG. 13. In the first embodiment described above, in the line of the processing system A for generating the high-resolution displacement signal, the resolution multiplying factor K in the amplification sections 402A, 404A is set to a predetermined fixed value according to whirling of the rotor shaft 5. However, due to accumulation of the reactive product on the pump rotor 4, rotor imbalance becomes greater over time, and the whirling displacement during rotation at the rated speed becomes gradually greater.

For example, the case where the outer threshold To is set to 20 (μm) and the inner threshold Ti is set to 15 (μm) as shown in FIG. 11 will be described. When the whirling radius becomes greater than 10 (μm) due to accumulation of the reactive product and the displacement $X1(t)$, $Y1(t)$ becomes greater than 30 (μm) around an outer threshold To of 20 (μm), even if the whirling center of the rotor shaft 5 is at the target levitation position 70, the range of the signal input from the amplification section 402A to the AD converter 403 in the processing system A for generating the high-resolution displacement signal is over the full scale of the AD converter 403. As a result, there is a probability that proper magnetic bearing control cannot be performed.

For this reason, in the second embodiment, a resolution multiplying factor K in amplification sections 402A, 404A changes according to a whirling radius so that magnetic bearing control can be properly performed even when a whirling displacement of a rotor shaft 5 changes. In an example illustrated in FIG. 14, it is configured such that K can be changed to multiple values by the K setting section 510. The K setting section 510 is configured to set the value of the resolution multiplying factor K based on a steady-state whirling radius rx1, ry1 (see the expressions (1) and (2)) input from a low-pass filter 410. A switching control section 408 is configured to perform switching control using an outer threshold To and an inner threshold Ti according to the value of K set by the K setting section 510. Other configurations are similar to those of FIG. 13 described above.

Figure 15:
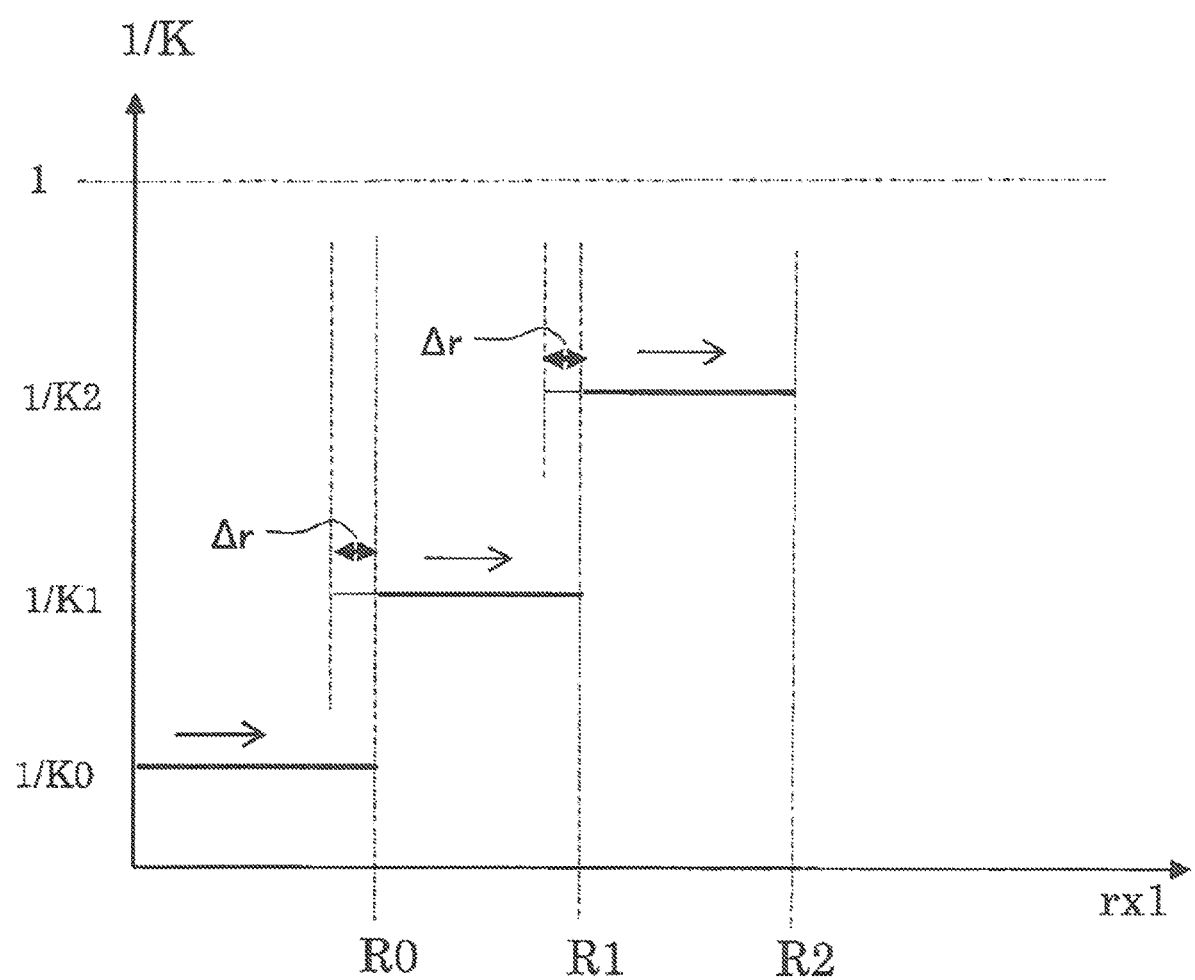
FIG. 15 is a graph for describing an example of settings of the resolution multiplying factor K for a whirling radius rx1.

FIG. 15 is a graph of an example of the method for setting the resolution multiplying factor K for the whirling radius rx1. Note that the same applies to other whirling radiuses than rx1. In FIG. 15, the horizontal axis represents the whirling radius rx1, and the vertical axis represents 1/k. The resolution multiplying factor K described herein changes at three levels of K0, K1, K2. These levels are set to K0>K1>K2.

In the state in which accumulation of a reactive product is less caused and the whirling radius rx1 is small as in rx1<R0, the resolution multiplying factor K is set to K0. When the whirling radius rx1 becomes slightly greater and R0≤rx1<R1 is satisfied, the K setting section 510 switches the resolution multiplying factor K of the amplification sections 402A, 404A from K0 to K1. When the whirling radius rx1 becomes more greater and R1≤rx1<R2 is satisfied, the resolution multiplying factor K is switched from K1 to K2. Note that the whirling radius changes only in an increment direction due to accumulation of the reactive product. However, chattering might be caused in switching of the resolution multiplying factor K, and therefore, a hysteresis Δr is set to prevent chattering.

Note that R2 is an acceptable upper limit of the whirling radius. When rx1>R2, such a state is determined as abnormal whirling, and normal control transitions to abnormality control.

FIG. 16A is a graph of an example of a relationship among the resolution multiplying factor K and the thresholds To, Ti. The resolution multiplying factor K is set corresponding to the outer threshold To. The resolution multiplying factor K0 described herein is a resolution multiplying factor in the case of an outer threshold To of 10 (μm). Similarly, K1 is a resolution multiplying factor in the case of an outer threshold To of 25 (μm), and K2 is a resolution multiplying factor in the case of an outer threshold To of 60 (μm). In the configuration illustrated in FIG. 14, switching between a high-resolution displacement signal and a normal-resolution displacement signal is, as in the case of the first embodiment, performed based on $ux1(t)$, $uy1(t)$. Thus, a hysteresis width for preventing chattering in switching depends on $ux1(t)$, $uy1(t)$. However, $ux1(t)$, $uy1(t)$ are unrelated to the whirling displacement, and therefore, the inner threshold Ti is set with a fixed hysteresis width in the example of FIG. 16A.

Figure 17A:
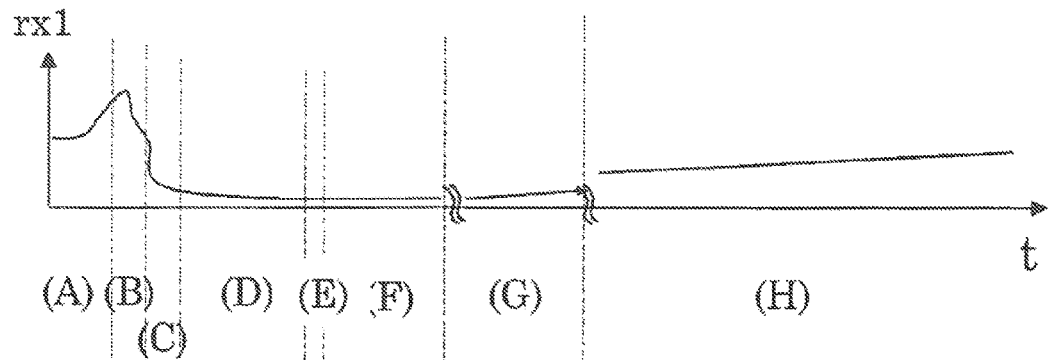
FIGS. 17A and 17B are graphs of an operation example of a K setting section 510.
Figure 17B:
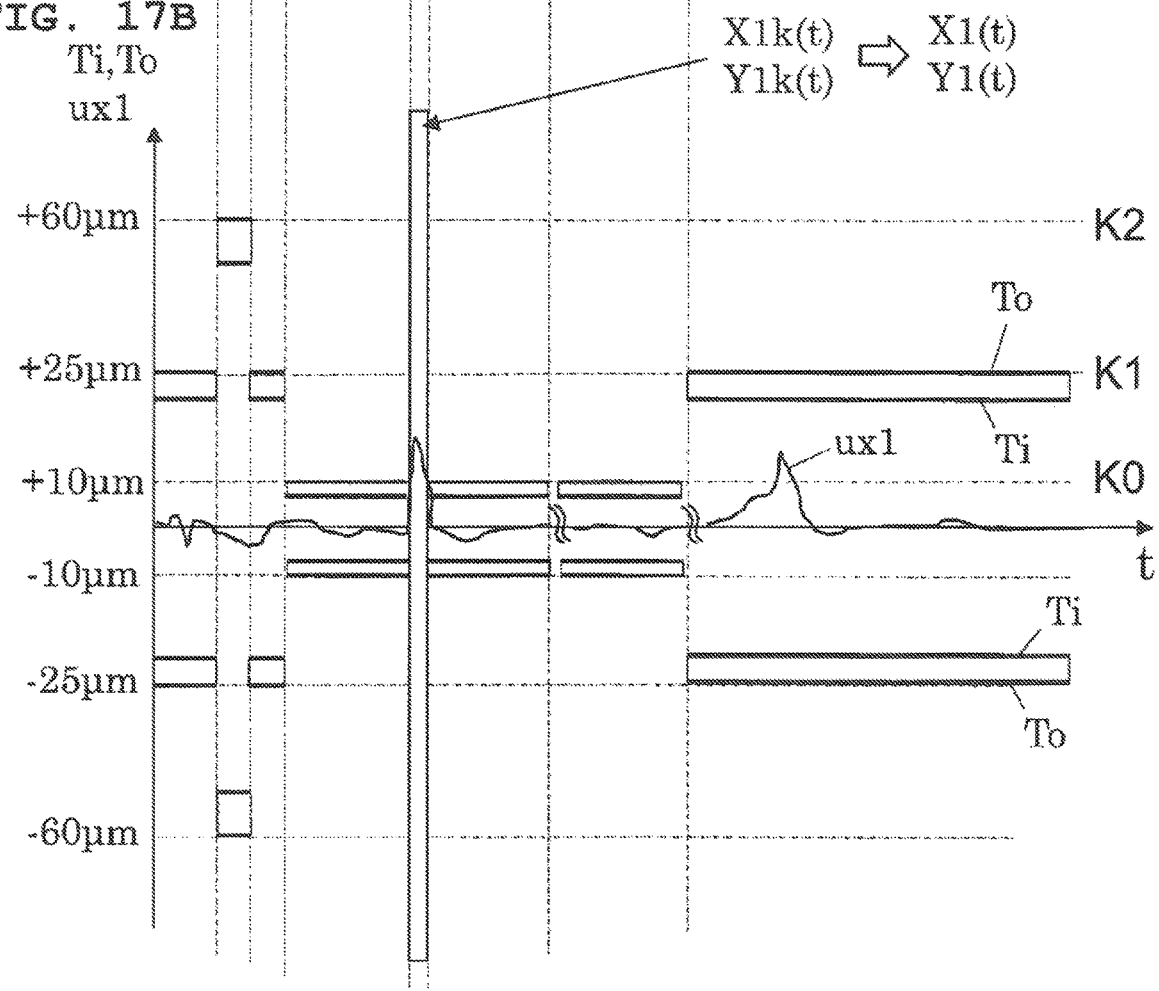

FIGS. 17A and 17B are graphs of an operation example of the K setting section 510. FIG. 17A shows a temporal change in the whirling radius rx1, and FIG. 17B shows a change in the displacement ux1 and the thresholds Ti, To. In a period (A), acceleration operation begins from a stop state, leading to a low rotation speed state. Moreover, the whirling radius rx1 is increased to a moderate level. Thus, the resolution multiplying factor K is set to K1, and the outer threshold To is set to ±25 (μm). The displacement ux1 falls within an outer threshold To range of ±25 (μm), and therefore, a high-resolution displacement signal X1k(t), Y1k(t) is selected by a switching section 407.

In a period (B), when a rotation speed reaches a rotation speed during running through a critical speed and the whirling radius rx1 exceeds 25 (μm) due to a transient whirling increase, the resolution multiplying factor K is switched from K1 to K2. When the resolution multiplying factor K is switched to K2, the outer threshold To is accordingly changed to ±60 (μm).

In a period (C), the operation transitions to acceleration operation after running through the critical speed, and the whirling radius rx1 gradually decreases as the rotation speed becomes close to a rated rotation speed. When the whirling radius rx1 reaches equal to or less than 25 (μm)–Δr, the resolution multiplying factor K is switched from K2 to K1, and the outer threshold To is changed to ±25 (μm).

In a period (D), a pump is in rated rotation operation. At this point, accumulation of the reactive product is much less caused, and disturbance is at a relatively-low level. Thus, the whirling radius rx1 is at a low level of several (μm), and the resolution multiplying factor K is switched from K1 to K0. Moreover, the outer threshold To is changed from ±25 (μm) to ±10 (μm).

The operation is in a rated rotation state during a period (E), but an excessive transient displacement is caused due to disturbance. As a result, the displacement ux1 becomes greater than the outer threshold To, and the switching section 407 switches the high-resolution displacement signal X1k(t), Y1k(t) to a normal-resolution displacement signal X1(t), Y1(t). Moreover, settings of the thresholds Ti, To for the whirling displacement are cancelled.

In a period (F), the increased displacement ux1 becomes smaller again due to disturbance elimination, and falls within the range of the inner threshold Ti. As a result, the normal-resolution displacement signal X1(t), Y1(t) is switched to the high-resolution displacement signal X1k(t), Y1k(t). Moreover, the whirling radius rx1 is small, and therefore, the outer threshold To is set to ±10 (μm).

A period (G) is a period at a point after a lapse of a long period of time from the period (F), and the rated rotation speed is maintained. However, the reactive product gradually increases, and the whirling radius rx1 also gradually increases. However, the whirling radius rx1 falls within an outer threshold To range of ±10 (μm) at this point, and therefore, the resolution multiplying factor K is maintained at K0.

A period (H) is a period at a point after a lapse of a long period of time from the period (G), and the whirling radius rx1 falls outside an outer threshold To range of ±10 (μm) due to an increase in accumulation of the reactive product. As a result, the resolution multiplying factor K is switched from K0 to K1, and the outer threshold To is also changed from ±10 (μm) to ±25 (μm). Thus, the displacement ux1 temporarily exceeds 10 (μm), but the whirling radius rx1 falls within an outer threshold To range of ±25 (μm). For this reason, the state in which the high-resolution displacement signal X1k(t), Y1k(t) is selected by the switching section 407 is maintained.

As described above, in the second embodiment, the following components are provided as illustrated in FIG. 14: a first conversion processing section 409 and the low-pass filter 410 provided in a steady-state response extraction section C and configured to generate the high-resolution displacement signal based on a signal obtained by amplifying a displacement modulated wave signal by the resolution multiplying factor K (note that K>1) in the amplification section 402A of the processing system A and to calculate the whirling radius rx1, ry1 of the steady-state whirling displacement based on the high-resolution or normal-resolution displacement signal; and the K setting section 510 configured to change the resolution multiplying factor K to anyone of the multiple values according to the whirling radius rx1, ry1.

That is, since the resolution multiplying factor K is set according to the whirling radius rx1, the magnetic bearing control can be performed with an optimal resolution according to the whirling radius even under the environment where the whirling radius increases, and therefore, vibration performance can be improved. For example, even when the whirling radius rx1 of the rotor shaft 5 increases due to, e.g., accumulation of the reactive product, it can be prevented that the range of a signal input to an AD converter 403 is over the full scale of the AD converter 403, and therefore, the magnetic bearing control can be properly performed using the displacement signal. Moreover, when accumulation of the reactive product is much less caused to such an extent that influence of such accumulation on the whirling radius can be ignored, the resolution multiplying factor K is set greater, and therefore, vibration can be reduced by resolution improvement.

Note that the configuration for changing the resolution multiplying factor K by the K setting section 510 is not limited to the configuration in which the high-resolution displacement signal and the normal-resolution displacement signal are switched to each other based on ux1(t), uy1(t) as illustrated in FIG. 14, and is applicable to the configuration in which switching is performed using the displacement signal X1(t), Y1(t) including the whirling displacement as in the comparative example illustrated in FIG. 5. For example, the timing for switching the resolution multiplying factor K is timing when the whirling radius rx1 reaches 10 (μm), 25 (μm), and 60 (μm).

FIG. 16B is a graph of the thresholds Ti, To. In the case of rx1=10 (μm), at least the outer threshold To needs to be 30 (μm) and the hysteresis width needs to be 20 (μm) for the purpose of preventing chattering as described above. The resolution multiplying factor K is set to K<10/3 to correspond to an outer threshold To of 30 (μm). Similarly, in the case of rx1=25 (μm), To=75 (μm) and Hysteresis Width=50 (μm). In the case of rx1=60 (μm), To=180 (μm) and Hysteresis Width=120 (μm). Note that when a nominal clearance of an emergency mechanical bearing is 100 (μm), the values in the case of rx1=60 (μm) are over the nominal clearance. Thus, in this case, the thresholds are set for up to rx1=25 (μm).

Third Embodiment

Figure 18:
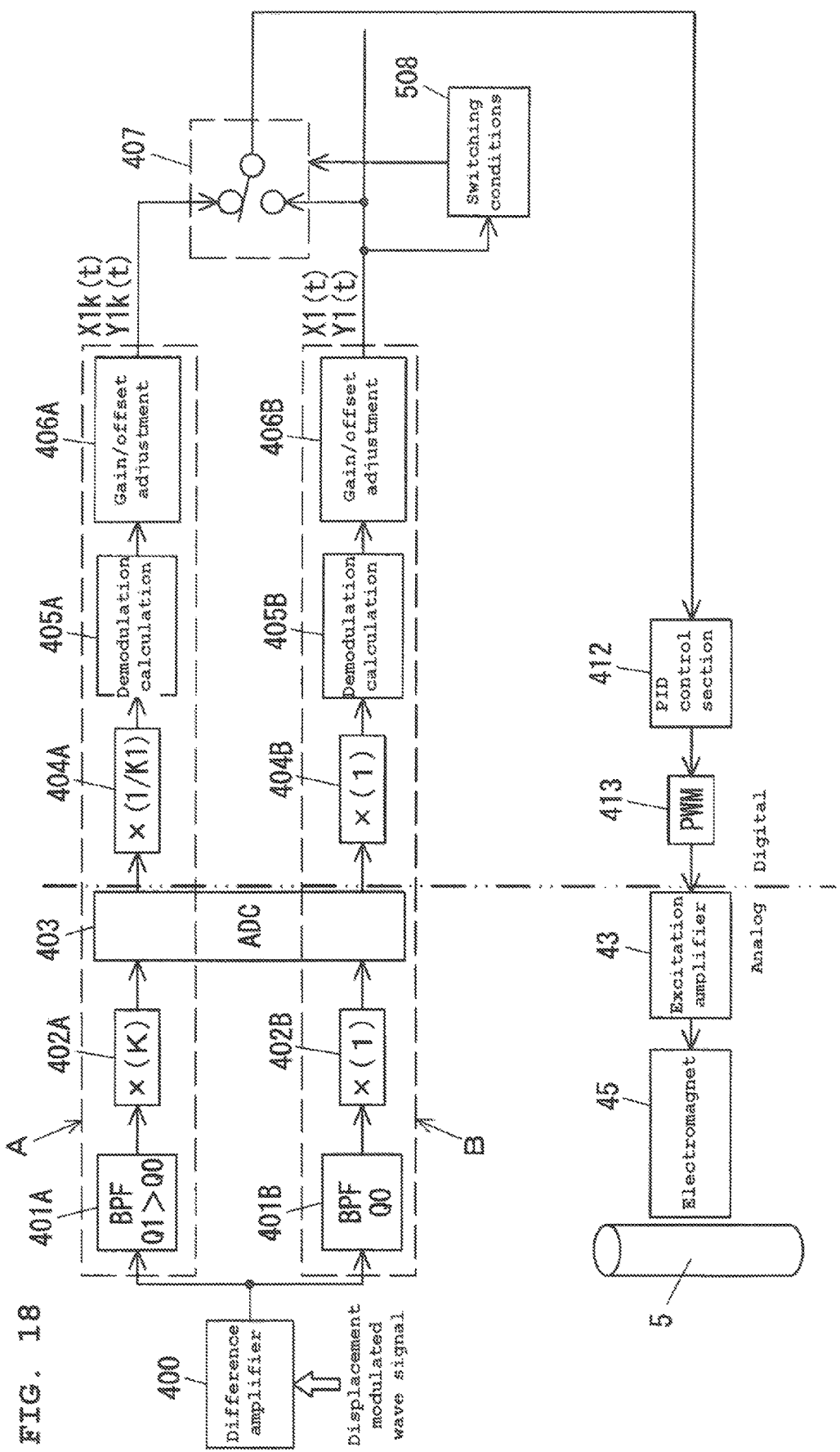
FIG. 18 is a view for describing a third embodiment of the present invention.

FIG. 18 is a diagram for describing a third embodiment of the present invention. In the present embodiment, the steady-state response extraction section C is omitted from the configuration illustrated in FIG. 5, a processing system A and a processing system B are different from each other in performance of bandpass filters 401A, 401B, and the gain of an amplification section 404A is (1/K1). Other configurations are similar to those of the block diagram illustrated in FIG. 5. In the present embodiment, a displacement signal SN ratio is, under a small-displacement situation, improved using a high-resolution displacement signal generated by the processing system A instead of a normal-resolution displacement signal generated by the processing system B, and a high-frequency noise component which might be a main factor for noise is particularly reduced.

As illustrated in FIG. 18, when a difference signal between displacement modulated wave signals is taken into an AD converter 403, an unnecessary noise component is cut in the bandpass filters 401A, 401B, and then, the resultant is taken into the AD converter 403. At this point, more band narrowing to a center frequency (a carrier wave fc in this case) by an increase in a Q-value (=Q1, Q0) of the bandpass filter 401A, 401B results in more high-frequency component removal of the demodulated displacement signal.

Note that a trade-off for increasing the Q-value is that a signal delay is increased and magnetic bearing control stability is lowered. In some cases, oscillation occurs with a high-order elastic natural frequency of a rotor. As a result, not only noise and vibration are caused, but also the problem of being difficult in levitation control is caused.

First, in the processing system B for generating the normal-resolution displacement signal, Q0 in the bandpass filter 401B is such a Q-value that lowering of the magnetic bearing control stability due to the signal delay is not caused. In the processing system A for generating the high-resolution displacement signal, Q1 as the Q-value of the bandpass filter 401A is set to, e.g., Q1>Q0 for the purpose of further band narrowing, and an amplification factor (a reduction ratio for reducing the amplitude of an amplified signal again) in the amplification section 404A is (1/K1). Then, K1 is set to satisfy (1/K1)<(1/K), i.e., K×(1/K1)<1, and therefore, the amplification factor (1/K1) is changed to an amplification factor less than the amplification factor (1/K1).

As described above, for the high-resolution displacement signal, a high-frequency component of the demodulated displacement signal is removed by band narrowing by setting to Q1>Q0, and the gain is decreased to equal to or less than one by setting to (1/K1)<(1/K). That is, influence of a decrease in a phase margin by setting to Q1>Q0 is cancelled in such a manner that a gain margin is increased by a decrease in the gain. Thus, the same degree of stability as that of a typical resolution displacement signal line can be ensured (i.e., a maximum value, which is equivalent to that of the typical resolution displacement signal line, of a sensitivity function as a stability index can be ensured).

Note that a trade-off for employing such a configuration is that disturbance response performance is lowered as compared to the case of applying a typical resolution displacement signal. However, the high-resolution displacement signal is applied only in the state in which great transient displacement requiring disturbance responsiveness is not caused, and therefore, no adverse effect is caused.

Figure 19A:
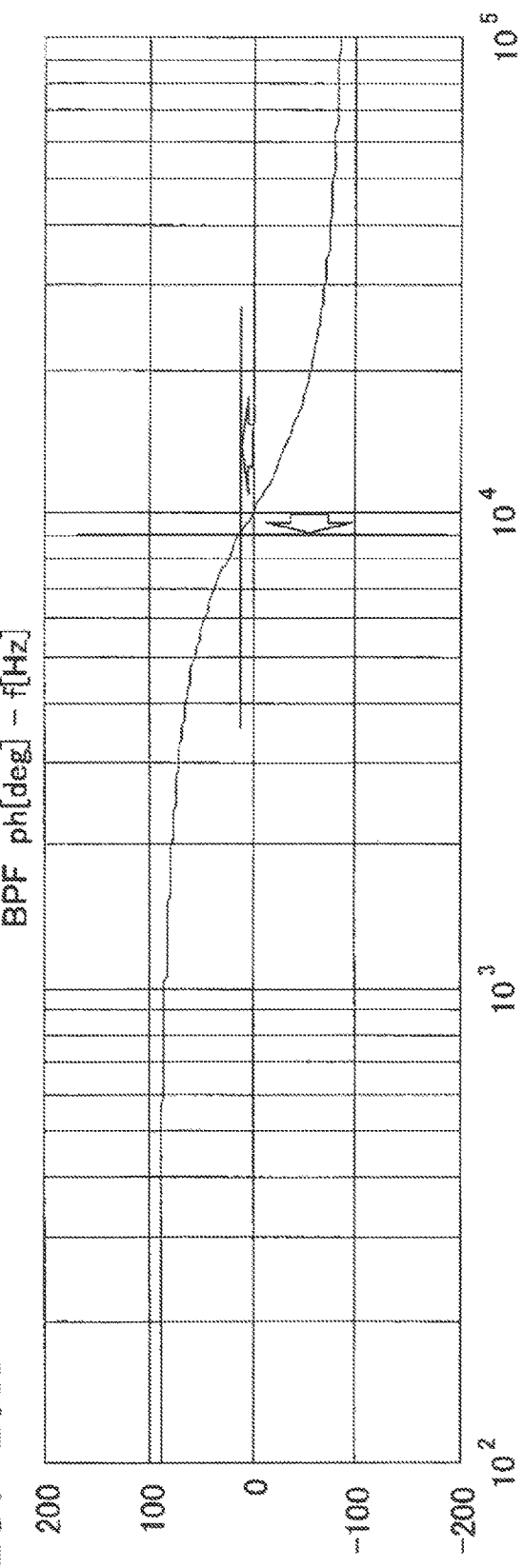
FIGS. 19A and 19B are graphs of an example of a signal delay and a gain in the case of a normal-resolution displacement signal.
Figure 19B:
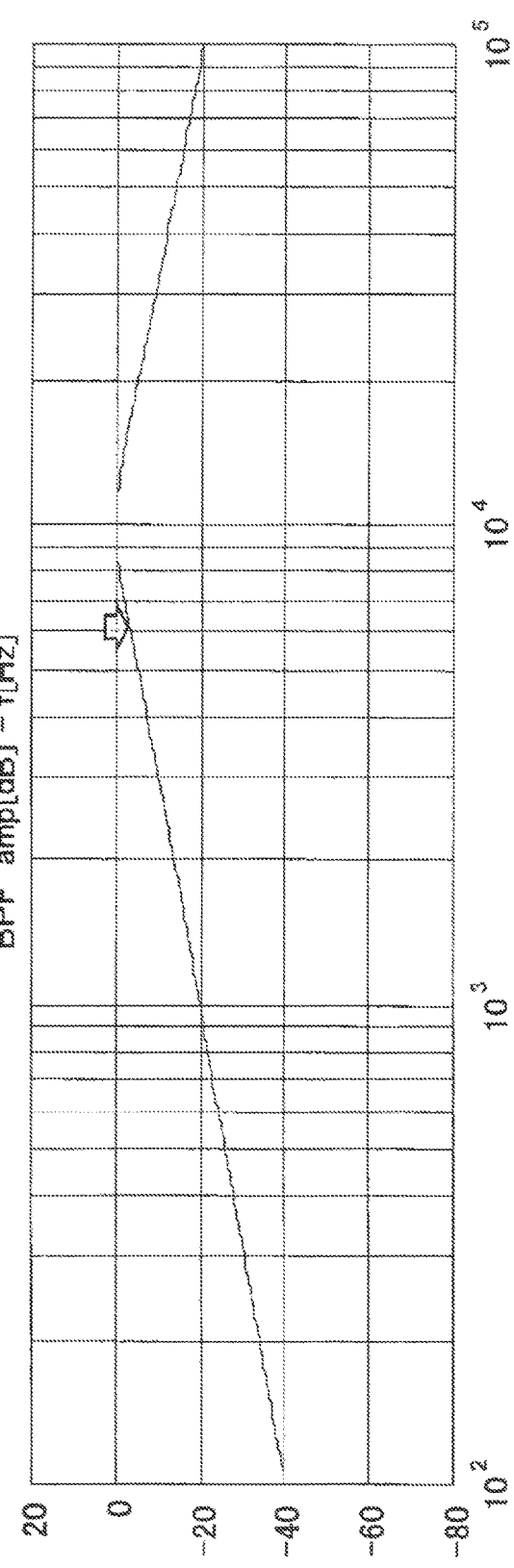

FIGS. 19A and 19B are graphs of an example of a signal delay and a gain in the bandpass filter 401B of the processing system B for generating the normal-resolution displacement signal. In this figures, a sensor carrier frequency is 10 (kHz), and Q0=1 is satisfied. When the displacement signal passes through the bandpass filter, the demodulated signal is always delayed with respect to the displacement signal. At this point, a higher frequency of the displacement signal results in a greater amount of phase delay. In FIG. 19A, the amount of phase delay is about 0 (deg), 10 (deg), and 20 (deg) respectively for frequencies of 100 (Hz), 1000 (Hz), and 2500 (Hz).

Although depending on a pump rotor size, control normally needs to be made until a one (kHz) band, and no control is necessary for a harmonic around four (kHz) as a main factor for noise. Since the amount of phase delay is 10 (deg) at one (kHz), the risk of oscillation with the elastic vibration natural frequency of the rotor shaft 5 is low. Note that the Q-value of the bandpass filter 401B in the processing system B is small, and therefore, amplitude reduction is less caused around four (kHz) as shown in FIG. 19B.

Figure 20A:
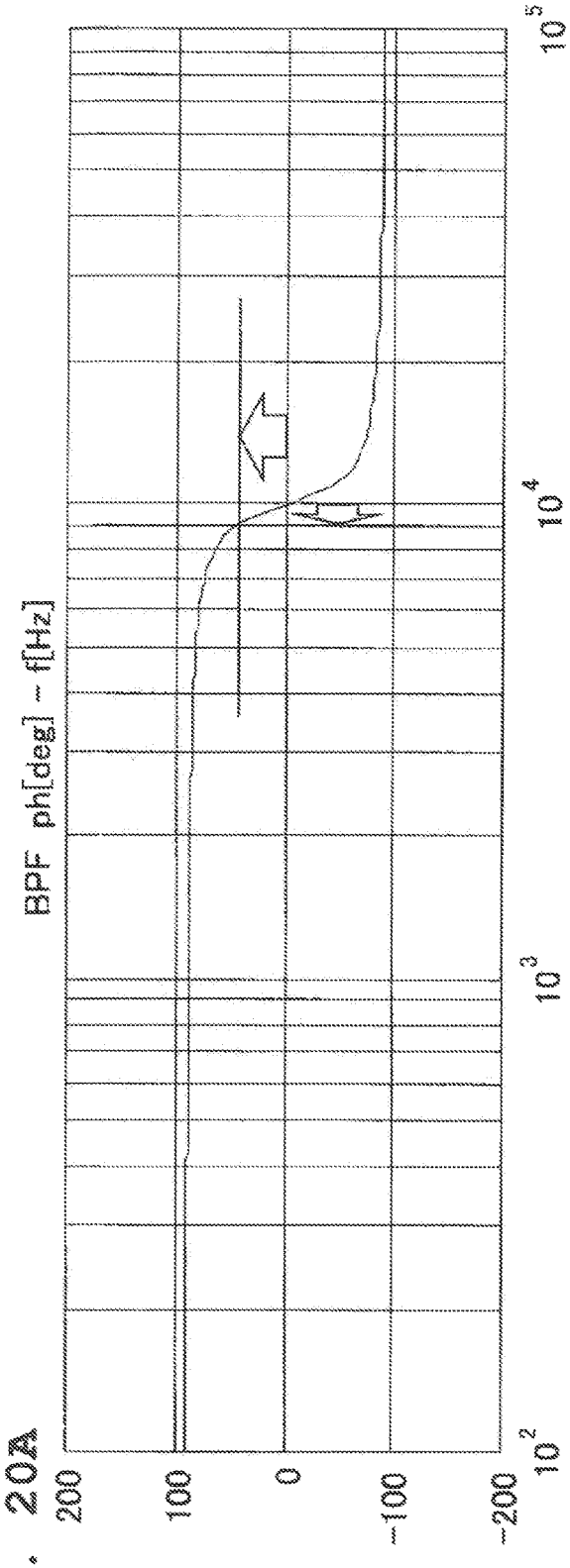
FIGS. 20A and 20B are graphs of an example of a signal delay and a gain in the case of a high-resolution displacement signal.
Figure 20B:
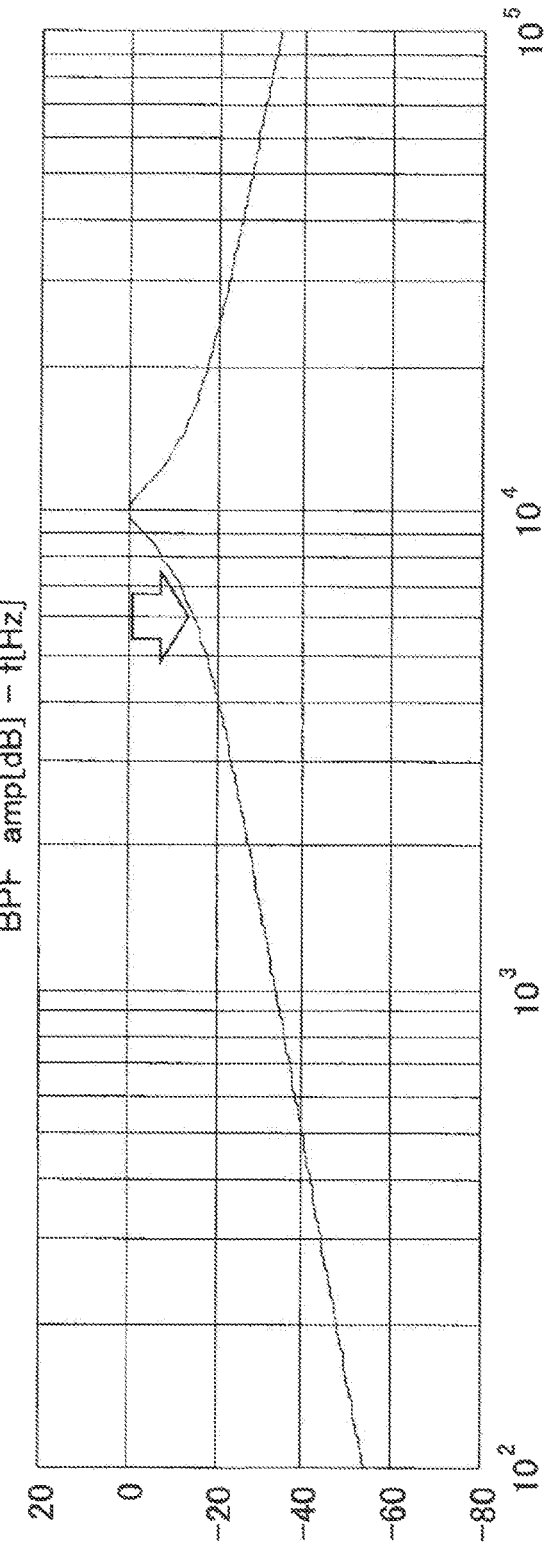

FIGS. 20A and 20B are graphs of an example of a signal delay and a gain in the bandpass filter 401A of the processing system A for generating the high-resolution displacement signal. A sensor carrier frequency is 10 (kHz), and the Q-value is Q1=5. As shown in FIG. 20A, the amounts of phase delay at frequencies of 100 (Hz), 1000 (Hz), and 2500 (Hz) are 10 (deg), 40 (deg), and 60 (deg), respectively. Moreover, as shown in FIG. 20A, a high-frequency component around four (kHz) as a factor for noise is significantly reduced. Thus, noise is reduced when the high-resolution displacement signal is selected.

Figure 21:
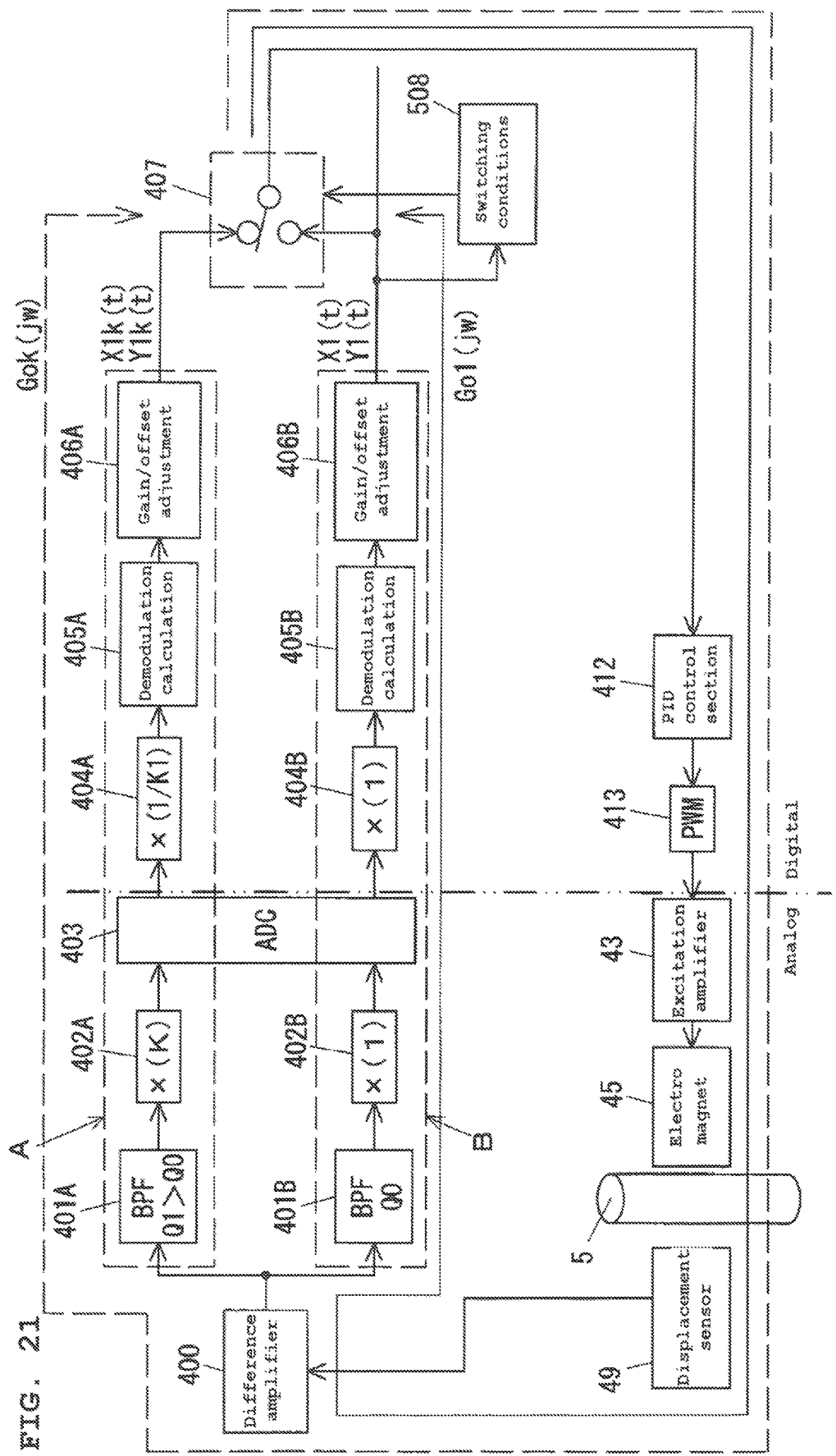
FIG. 21 is a diagram of an open-loop transfer function Gok(jw) in the case of using a processing system A and an open-loop transfer function Go1($jw$) in the case of using a processing system B.

The method for setting K1 in the amplification factor (1/K1) will be described with reference to FIGS. 21 to 23. FIG. 21 is a diagram of an open-loop transfer function Gok(jw) in the case of using the processing system A and an open-loop transfer function Go1(jw) in the case of using the processing system B. Note that FIG. 21 illustrates a configuration in the case where a displacement modulated wave signal is obtained using an inductance displacement sensor 49.

Figure 22:
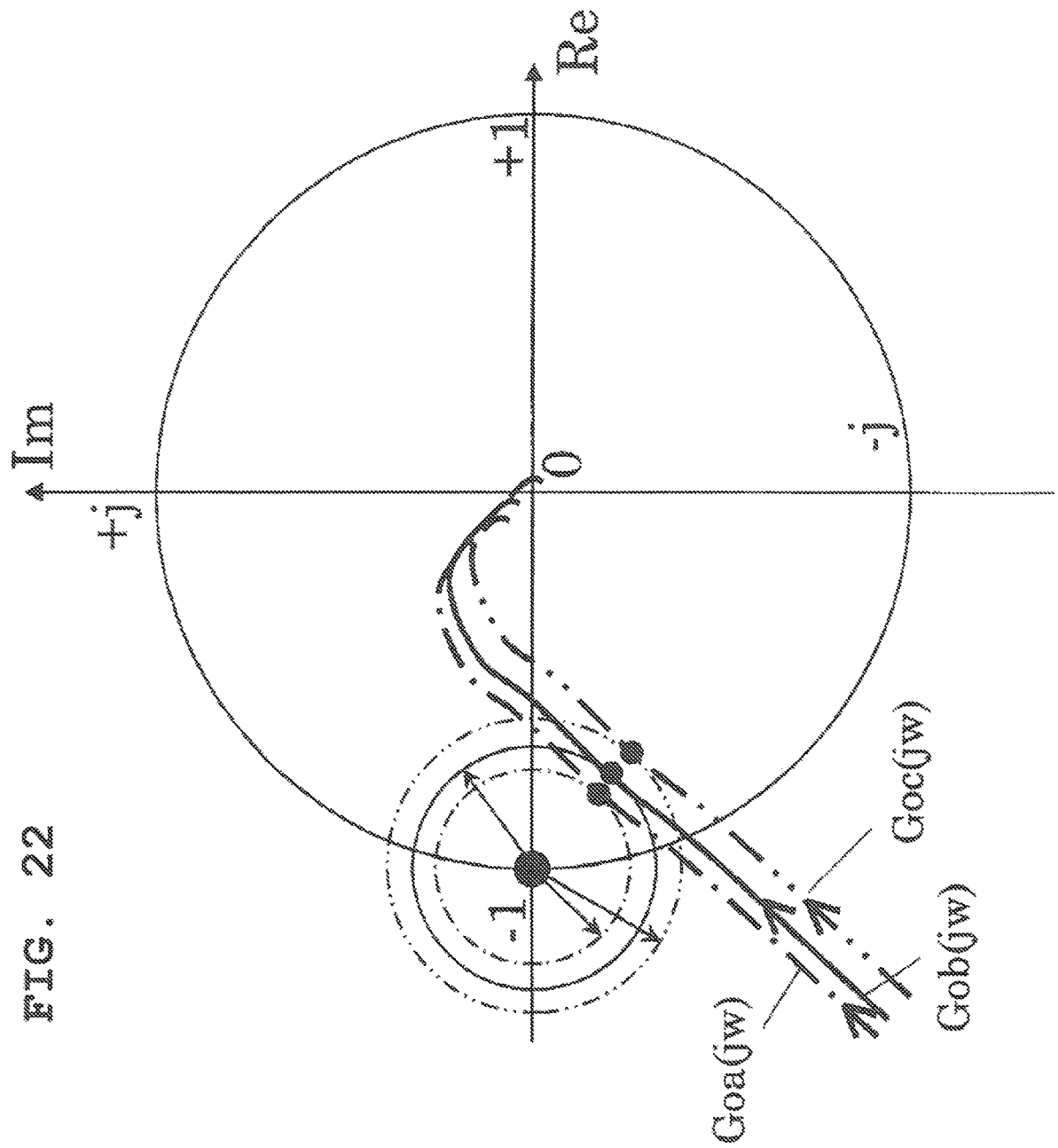
FIG. 22 is a graph for describing control stability using a Nyquist diagram.

Generally, when a frequency sweep of the open-loop transfer function Go is made and a so-called "Nyquist diagram" is plotted on a complex plane as shown in FIG. 22, the stability increases in the order of Goa<Gob<Goc. That is, a farther locus from (−1) on the complex plane results in a higher stability. In terms of a sensitivity function (1/(1+Go)) defined by an inverse of a distance (|1+Go|) from (−1), a smaller maximum value of the sensitivity function results in a higher stability.

Figure 23:
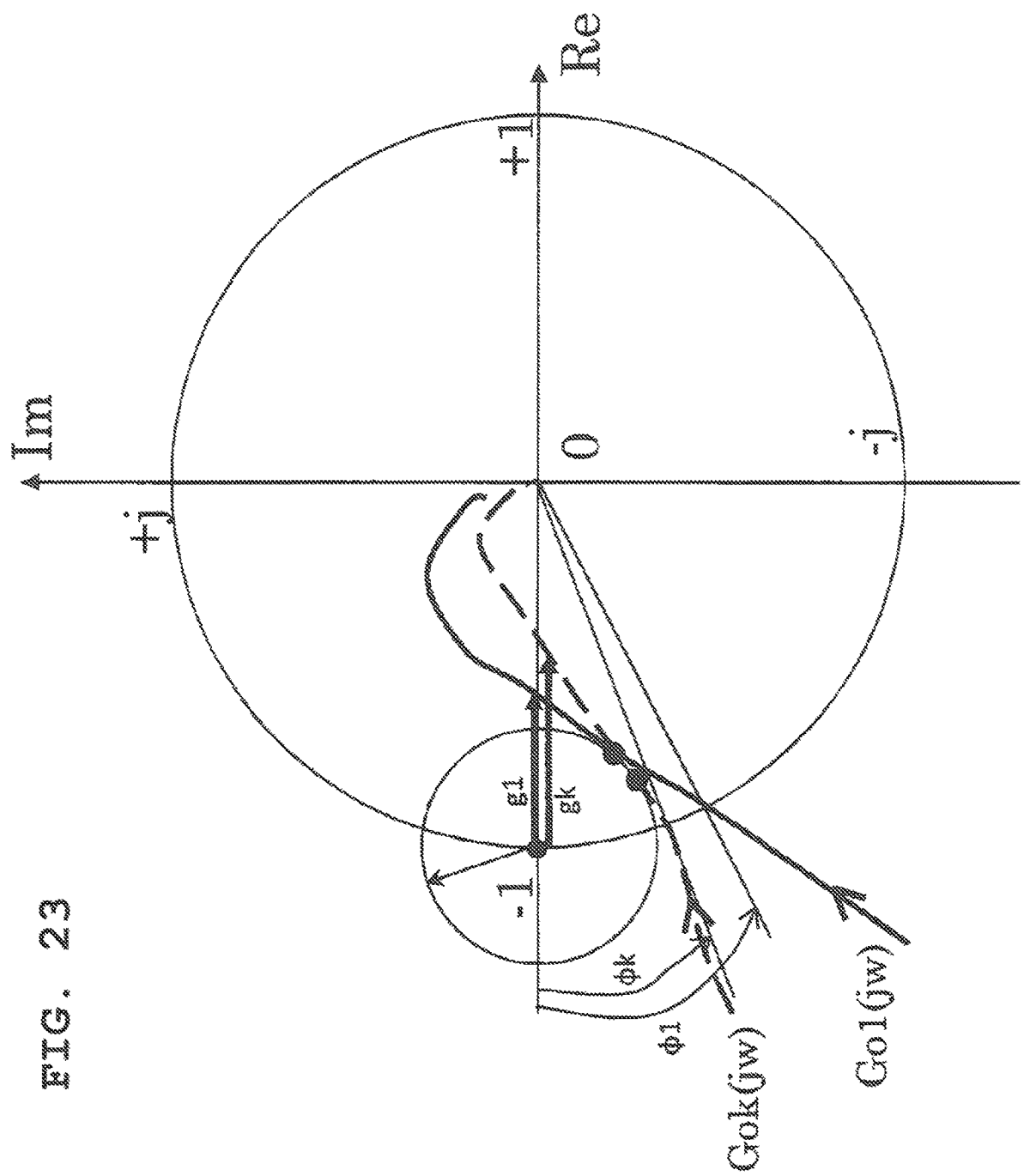
FIG. 23 is a graph for describing the control stability using a Nyquist diagram.

The stability of the line of the processing system A is set to the same level as that of the line of the processing system B in the following manner: a locus of Gok (jw) contacts a locus of Go1(jw) on the same circle (a circle about −1) as shown in FIG. 23; or the value of K1 is determined in advance such that the locus of Gok(jw) passes outside the circle.

Note that narrowing of the value of K1 to an optimal value is actually determined as a result of adjustment (trial and error) in product development or product shipping, and for this reason, K1>K is at least determined as a condition satisfying K×(1/K1)<1 for decreasing the gain than that of the line of the processing system B. In other words, since the Q-value of the bandpass filter 401A is higher in the line of the processing system A, the phase margin is always decreased as compared to that of the line of the processing system B as in ϕK<ϕ1 of FIG. 23. Thus, the gain of the line of the processing system A is decreased as compared to that of the line of the processing system B as in K×(1/K1)<1, and in this manner, the gain margin makes up for a decrease in the phase margin as in g1<gk of FIG. 23. Consequently, the stability is reliably enhanced.

Figure 24:
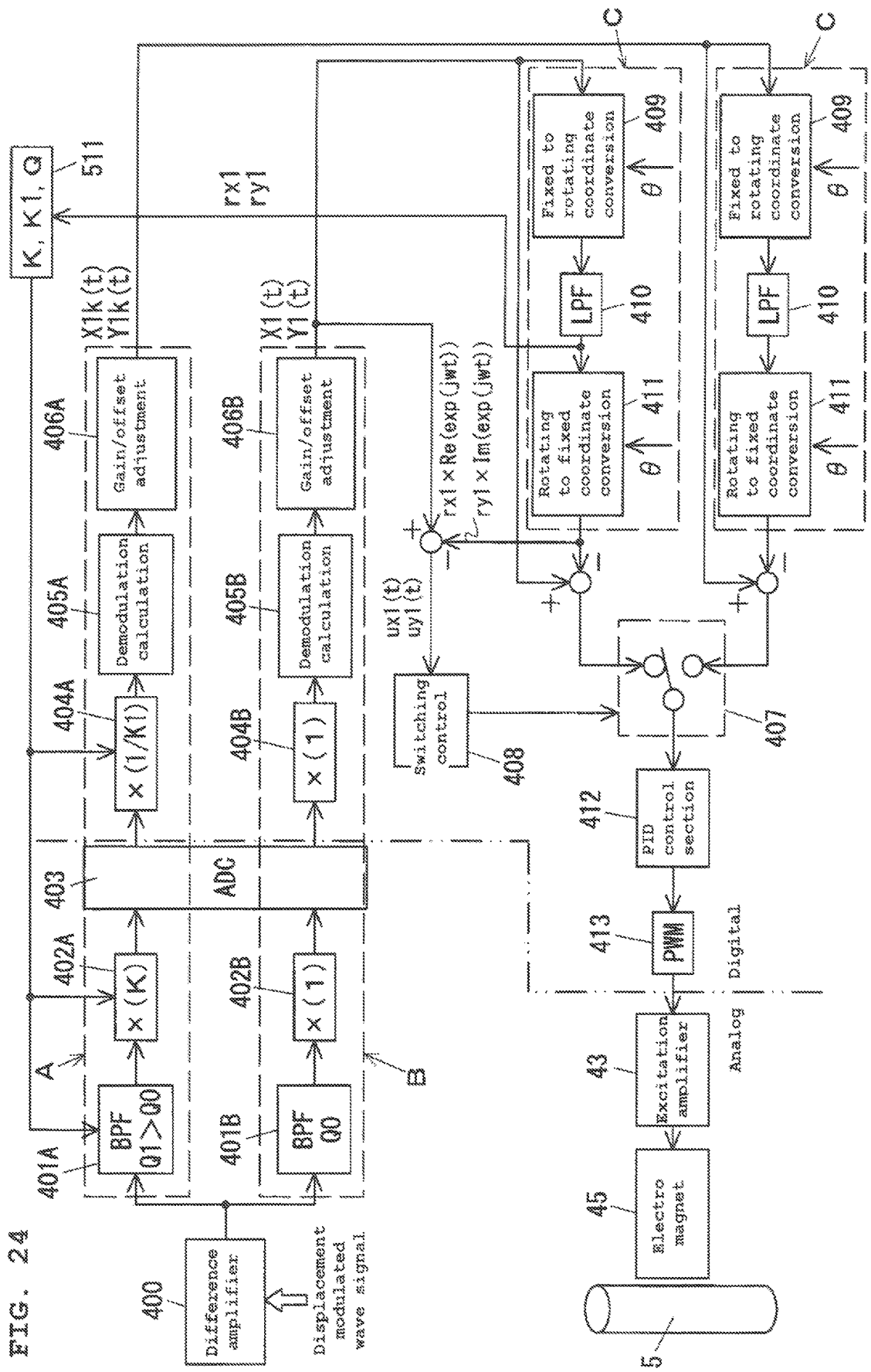
FIG. 24 is a diagram of a variation of the third embodiment.

Note that as in the case of the first embodiment, the steady-state response extraction section C of FIG. 3 may be added to the configuration of FIG. 18, and a switching control section 508 may be replaced with the switching control section 408. Switching between the normal-resolution displacement signal and the high-resolution displacement signal by the switching section 407 may be controlled based on other components ux1(t), uy1(t) than a steady-state response. Further, as illustrated in FIG. 24, a data setting section 511 configured to set the values of (K, K1, Q1) may be provided in addition to the steady-state response extraction section C and the switching control section 408. The data setting section 511 is configured such that plural data sets of (K, K1, Q1) are prepared in advance, and is configured to select a data set based on a whirling radius rx1, ry1 to change settings of Q1, K, and K1 in the bandpass filter 401A and the amplification sections 402A, 404A.

As described above, according to the third embodiment, Q1 as the Q-value of the bandpass filter 401A is, in the processing system A for generating the high-resolution displacement signal, greater than Q0 as the Q-value of the bandpass filter 401B of the processing system B, and therefore, the high-frequency noise component as the main factor for noise is removed. In addition, the amplification factor (1/K1) is set such that the product of the amplification factor (i.e., a resolution multiplying factor) K of the amplification section 402A and the amplification factor (1/K1) of the amplification section 404A is less than one, and therefore, the stability equivalent to that of the processing system B is ensured.

With such a configuration, not only the SN ratio is improved by improvement of the resolution of the displacement signal, but also the high-frequency (including 4 kHz) component which might be the main factor for noise is actively reduced. Thus, vibration and noise can be more reduced as compared to a typical case while highly-reliable operation can be performed with levitation control stability.

Various embodiments and variations have been described above, but the present invention is not limited to the contents of these embodiments and variations. Other aspects conceivable within the scope of the technical idea of the present invention are included in the scope of the present invention. For example, the turbo-molecular pump has been described as an example, but the present invention is applicable to other vacuum pumps as long as these pumps are of a magnetic bearing type.

What is claimed is:

1. A magnetic bearing vacuum pump comprising:
a magnetic bearing configured to magnetically levitate a rotor;
a first displacement signal generation section configured to amplify, by a resolution multiplying factor K of K>1, a displacement modulated wave signal modulated according to a displacement of the rotor from a predetermined position to generate a high-resolution displacement signal in a first displacement region including the predetermined position based on the amplified displacement modulated wave signal;
a second displacement signal generation section configured to generate a low-resolution displacement signal in a larger second displacement region including the first displacement region based on the displacement modulated wave signal;
a selection section configured to select either one of the high-resolution displacement signal or the low-resolution displacement signal based on an unsteady-state response signal obtained by excluding a steady-state whirling displacement component from the high-resolution displacement signal or the low-resolution displacement signal; and
a bearing control section configured to control the magnetic bearing based on the displacement signal selected by the selection section.

2. The magnetic bearing vacuum pump according to claim 1, further comprising:
a steady-state response calculation section configured to calculate a steady-state whirling radius based on the high-resolution displacement signal or the low-resolution displacement signal; and a factor changing section configured to change the resolution multiplying factor K to any one of multiple values according to the steady-state whirling radius.

3. The magnetic bearing vacuum pump according to claim 1, wherein
the first displacement signal generation section includes
a first bandpass filter having a first Q-value and configured to filter the displacement modulated wave signal,
an amplification section configured to amplify, by the resolution multiplying factor K, a signal having passed through the first bandpass filter,
a first AD conversion section configured to perform analog-to-digital conversion for the amplified signal, and
a reduction section configured to reduce the analog-to-digital converted signal with a reduction ratio lower than 1/the resolution multiplying factor, and
the first displacement signal generation section generates the high-resolution displacement signal based on the reduced signal,
the second displacement signal generation section includes
a second bandpass filter having a second Q-value less than the first Q-value and configured to filter the displacement modulated wave signal, and
a second AD conversion section configured to perform analog-to-digital conversion for a signal having passed through the second bandpass filter, and
the second displacement signal generation section generates the low-resolution displacement signal based on a signal output from the second AD conversion section.

4. A magnetic bearing vacuum pump comprising:
a magnetic bearing configured to magnetically levitate a rotor;
a first displacement signal generation section configured to amplify, by a resolution multiplying factor K of K>1, a displacement modulated wave signal modulated according to a displacement of the rotor from a predetermined position to generate a high-resolution displacement signal in a first displacement region including the predetermined position based on the amplified displacement modulated wave signal;
a second displacement signal generation section configured to generate a low-resolution displacement signal in a larger second displacement region including the first displacement region based on the displacement modulated wave signal;
a selection section configured to select either one of the high-resolution displacement signal or the low-resolution displacement signal;
a bearing control section configured to control the magnetic bearing based on the displacement signal selected by the selection section;
a steady-state response calculation section configured to calculate a steady-state whirling radius based on the high-resolution displacement signal or the low-resolution displacement signal; and
a factor changing section configured to change the resolution multiplying factor K to any one of multiple values according to the steady-state whirling radius.

5. The magnetic bearing vacuum pump according to claim 4, wherein
the first displacement signal generation section includes
a first bandpass filter having a first Q-value and configured to filter the displacement modulated wave signal, an amplification section configured to amplify, by the resolution multiplying factor K, a signal having passed through the first bandpass filter,
a first AD conversion section configured to perform analog-to-digital conversion for the amplified signal, and
a reduction section configured to reduce the analog-to-digital converted signal with a reduction ratio lower than 1/the resolution multiplying factor, and
the first displacement signal generation section generates the high-resolution displacement signal based on the reduced signal,
the second displacement signal generation section includes
a second bandpass filter having a second Q-value less than the first Q-value and configured to filter the displacement modulated wave signal, and
a second AD conversion section configured to perform analog-to-digital conversion for a signal having passed through the second bandpass filter, and
the second displacement signal generation section generates the low-resolution displacement signal based on the analog-to-digital converted signal.

6. A magnetic bearing vacuum pump comprising:
a magnetic bearing configured to magnetically levitate a rotor;
a first bandpass filter having a first Q-value and configured to filter a displacement modulated wave signal modulated according to a displacement of the rotor from a predetermined position;
an amplification section configured to amplify, by a resolution multiplying factor K of K>1, a signal having passed through the first bandpass filter;
a first AD conversion section configured to perform analog-to-digital conversion for the signal amplified by the amplification section;
a reduction section configured to reduce the signal analog-to-digital converted by the first AD conversion section with a reduction ratio lower than 1/the resolution multiplying factor;
a first displacement signal generation section configured to generate a high-resolution displacement signal in a first displacement region including the predetermined position based on the signal reduced by the reduction section;
a second bandpass filter having a second Q-value less than the first Q-value and configured to filter the displacement modulated wave signal;
a second AD conversion section configured to perform analog-to-digital conversion for a signal having passed through the second bandpass filter;
a second displacement signal generation section configured to generate a low-resolution displacement signal in a larger second displacement region including the first displacement region based on the signal analog-to-digital converted by the second AD conversion section;
a selection section configured to select either one of the high-resolution displacement signal or the low-resolution displacement signal; and
a bearing control section configured to control the magnetic bearing based on the displacement signal selected by the selection section.

7. The magnetic bearing vacuum pump according to claim 2, wherein
the steady-state whirling radius when the resolution multiplying factor K is changed from a first value to a second value less than the first value is, by a predetermined hysteresis width, set greater than the steady-state whirling radius when the resolution multiplying factor K is changed from the second value to the first value.

8. The magnetic bearing vacuum pump according to claim 1, wherein
the selection section
switches the selected displacement signal from the low-resolution displacement signal to the high-resolution displacement signal when a value of the unsteady-state response signal changes from an outside to an inside of a first signal region, and
switches the selected displacement signal from the high-resolution displacement signal to the low-resolution displacement signal when the value of the unsteady-state response signal changes from an inside to an outside of a larger second signal region including the first signal region.

9. The magnetic bearing vacuum pump according to claim 1, wherein
when a ratio between the steady-state whirling radius and an upper limit of the displacement from the predetermined position is α, the resolution multiplying factor K is set to satisfy an expression of $1/(3α)<K<1/α$.

10. The magnetic bearing vacuum pump according to claim 4, wherein
the steady-state whirling radius when the resolution multiplying factor K is changed from a first value to a second value less than the first value is, by a predetermined hysteresis width, set greater than the steady-state whirling radius when the resolution multiplying factor K is changed from the second value to the first value.

11. The magnetic bearing vacuum pump according to claim 5, wherein
the steady-state whirling radius when the resolution multiplying factor K is changed from a first value to a second value less than the first value is, by a predetermined hysteresis width, set greater than the steady-state whirling radius when the resolution multiplying factor K is changed from the second value to the first value.

* * * * *